United States Patent
Mikkelson

(10) Patent No.: US 11,234,381 B1
(45) Date of Patent: *Feb. 1, 2022

(54) CENTRALIZED MONITORING AND MANAGEMENT OF MICRO-CLIMATES

(71) Applicant: SubAir Systems LLC, Graniteville, SC (US)

(72) Inventor: Bruce E. Mikkelson, Surf City, NC (US)

(73) Assignee: SubAir Systems LLC, Graniteville, SC (US)

( * ) Notice: Subject to any disclaimer, the term of this patent is extended or adjusted under 35 U.S.C. 154(b) by 137 days.

This patent is subject to a terminal disclaimer.

(21) Appl. No.: 16/267,656

(22) Filed: Feb. 5, 2019

Related U.S. Application Data

(60) Provisional application No. 62/626,387, filed on Feb. 5, 2018.

(51) Int. Cl.
A01G 25/16 (2006.01)

(52) U.S. Cl.
CPC ................................. A01G 25/167 (2013.01)

(58) Field of Classification Search
CPC .................................................... A01G 25/167
See application file for complete search history.

(56) References Cited

U.S. PATENT DOCUMENTS

| | | | |
|---|---|---|---|
| 7,413,380 B2* | 8/2008 | Corwon | E01C 13/02 |
| | | | 137/78.3 |
| 2006/0202051 A1* | 9/2006 | Parsons | E03D 3/02 |
| | | | 239/69 |
| 2010/0147389 A1* | 6/2010 | Blanchard | A01G 25/167 |
| | | | 137/1 |
| 2011/0111700 A1* | 5/2011 | Hackett | A01G 25/16 |
| | | | 455/41.2 |
| 2012/0239211 A1* | 9/2012 | Walker | A01G 25/16 |
| | | | 700/284 |

FOREIGN PATENT DOCUMENTS

| | | | | |
|---|---|---|---|---|
| AU | 2012201262 B2 * | 11/2015 | | G01N 3/303 |
| CN | 105389663 A * | 3/2016 | | |

* cited by examiner

*Primary Examiner* — Chad G Erdman
(74) *Attorney, Agent, or Firm* — Myers Bigel, P.A.

(57) ABSTRACT

A turf management system for a multi-climate environment including respective micro-climates at different green surfaces that are remote from one another includes a plurality of local control circuits including respective communication interfaces that are configured to receive sensor data from environmental sensors that are locally positioned at the different green surfaces, and a central control circuit that is configured to be communicatively coupled to the local control circuits. The central control circuit includes a network interface that is configured to receive data indicating differing local conditions at the respective micro-climates from the local control circuits, and a processor that is configured to aggregate the data indicating the differing local conditions at the respective micro-climates for output to a user interface. Related circuits, methods of operation, and computer program products are also discussed.

22 Claims, 26 Drawing Sheets

| Hole | System Status | Blower Amps | Blower Freq | Pump Amps | Fan Status | Ambient Air Temp | Enclosure Air Temp |
|---|---|---|---|---|---|---|---|
| 1 | | | | | | | |
| 2 | | | | | | | |
| 3 | | | | | | | |
| 4 | | | | | | | |
| 5 | | | | | | | |
| 6 | Idle | 123.1 A | 123.1 Hz | 123.1 A | OFF | 123.1 F | 123.1 F |
| 7 | | | | | | | |
| 8 | | | | | | | |
| 9 | | | | | | | |
| 10 | | | | | | | |
| 11 | | | | | | | |
| 12 | | | | | | | |
| 13 | | | | | | | |
| 14 | | | | | | | |
| 15 | | | | | | | |
| 16 | | | | | | | |
| 17 | Idle | 123.1 A | 123.1 Hz | 123.1 A | OFF | 123.1 F | 123.1 F |
| 18 | | | | | | | |
| P1 | | | | | | | |
| P2 | | | | | | | |
| P3 | | | | | | | |
| P4 | | | | | | | |

Date & Time:

FIG. 5B

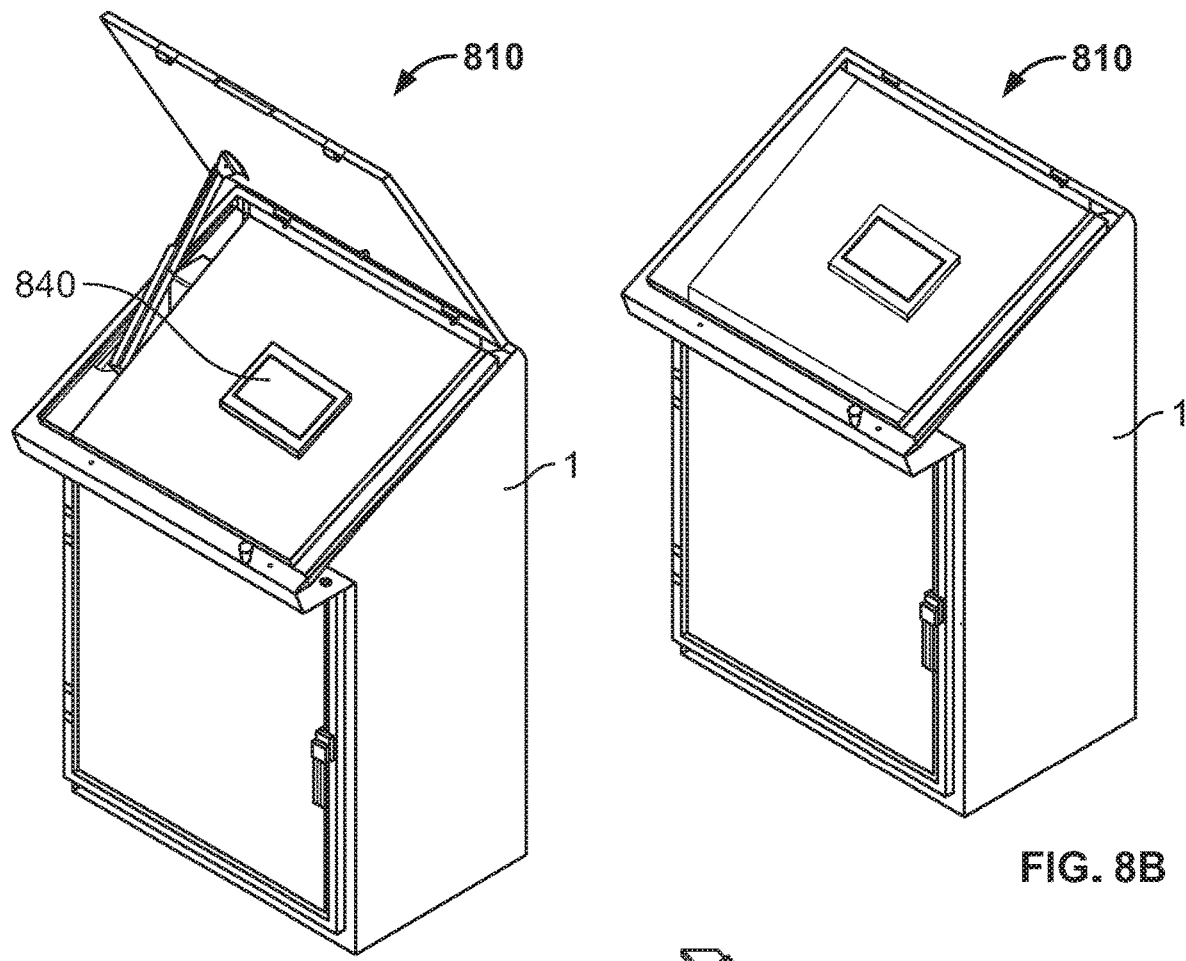
FIG. 8A
FIG. 8B
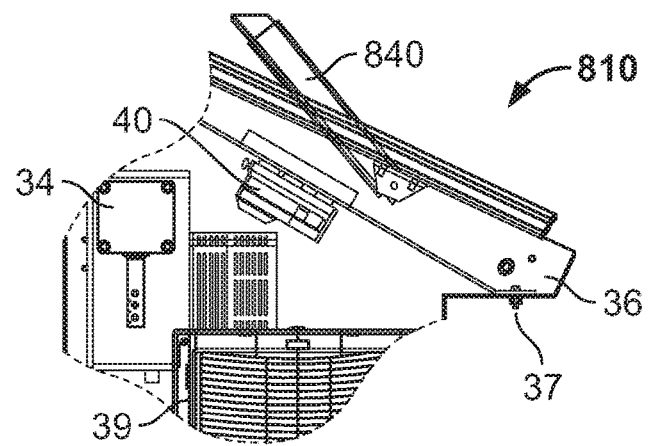
FIG. 8C

CENTRALIZED MONITORING AND MANAGEMENT OF MICRO-CLIMATES

CLAIM OF PRIORITY

This application claims priority from U.S. Provisional Patent Application No. 62/626,387, filed Feb. 5, 2018 in the United States Patent and Trademark Office, the disclosure of which is incorporated by reference herein in its entirety.

FIELD

The present invention relates to turf management systems and related devices and methods of operation.

BACKGROUND

Grass plants may require particular environmental conditions to thrive. An optimum growing environment for grass plants may entail a proper amount of sun, proper air/water ratios, and proper soil temperatures. Likewise, damage to grass plants can be caused by exposure to extreme (high or low) temperatures.

Turf management systems can be used to compensate for some such environmental conditions, by maintaining desired root zone temperatures and/or moisture conditions for grass plant environments. For example, some turf management systems may utilize a blower or other air flow mechanism to create air flow through the root zone of the grass plants for temperature and/or moisture management. Also, hydronic mechanisms may be used to circulate warm or cool fluid, such as water, from a holding tank to a grassy area via a network of in-ground flexible tubing.

SUMMARY

Some embodiments described herein are directed to turf management systems for a multi-climate environment, which includes a plurality of micro-climates at different green surfaces in the environment. A turf management system may include a local control unit or circuit for each micro-climate, and a central control unit or circuit that is communicatively coupled to each of the local control units via a wired and/or wireless interface to monitor and manage operation thereof in real-time according to the different and/or varying conditions at each micro-climate.

A local control unit or circuit may include a local communication interface that is configured to receive sensor data from one or more environmental sensors that are local to its respective micro-climate. The environmental sensors may be in-ground wireless sensors, and may be distributed in multiple zones of and/or at multiple depths below the green surface for a corresponding micro-climate. The sensor data provided by the environmental sensors may indicate local conditions at the respective micro-climate, including soil temperatures, moisture, salinity, and/or oxygen levels, in real-time. The local control unit, environmental sensors, and/or any repeater units for each micro-climate may define a wired and/or wireless local network. The local control unit may include a controller, such as a programmable logic controller (PLC) or processor, and a central communication interface configured to convert the sensor data into a desired format and communicate the data indicating the local conditions at its respective micro-climate to the central control unit via a wired and/or wireless central network.

In some embodiments, the local control unit may be configured to be coupled to and to control operation of a subsurface turf management mechanism, such as a sub-soil air flow mechanism and/or in-ground hydronic mechanism, underlying the green surface at its respective micro-climate to alter and/or maintain the soil profile temperatures and/or moisture levels at its respective micro-climate in real-time, responsive to the sensor data received from the environmental sensors.

In some embodiments, the local control unit may include a user interface that is configured to control operation of the sub-soil air flow mechanism and/or in-ground hydronic mechanism responsive to a user input.

In some embodiments, the local control unit may be configured to provide a repeater functionality by receiving data indicative of local conditions at another micro-climate from another local control unit positioned at a different location in the environment, and may be configured to relay the data from the another local control unit to the central network.

A central control unit or circuit may include a controller or processor and a central communication interface configured to receive the data indicating the local conditions from the local control units and/or repeater units at the respective micro-climates via the wired and/or wireless central network. The central control unit may be configured to monitor, relay, and/or output control signals in response to the local conditions at the respective micro-climates indicated by the received data.

In some embodiments, the central control unit may be configured to aggregate the data indicating the local conditions for the respective micro-climates and provide the data as an output for display via a user interface. The user interface may be a dedicated user interface that is located in the multi-climate environment, and/or may be a user interface of a smartphone, tablet, or computer that is communicatively coupled to the central control unit. The user interface may aggregate and display the respective local conditions at each micro-climate, providing a global overview of the entire operating environment and highlighting differences in local environmental conditions between the individual micro-climates. For example, the user interface may alert a user to soil temperature and/or moisture levels at any of the micro-climates that exceed respective user-defined thresholds for soil temperature and/or moisture level ranges.

In some embodiments, the central control unit may be configured to monitor communications from the local control units and control routing of network traffic/data to and/or from the local control units based on the monitoring. For example, the central control unit may provide control signals to one or more of the local control units to relay data through one or more other of the local control units based on detection of differences in transmission/reception of the data from the one or more of the local control units, for instance, due to signal interference and/or malfunction.

In some embodiments, the central control unit may be configured to provide respective control signals to the local control units to alter or otherwise regulate operation of the sub-soil air flow mechanism and/or in-ground hydronic mechanism underlying the green surface at a respective micro-climate responsive to a user input and/or automatically based on the local conditions indicated by the data received from the corresponding local control unit. For example, respective user-defined thresholds for soil temperature and/or moisture level ranges may be specified for one or more of the micro-climates via a user interface. The central control unit may be configured to monitor the local conditions at each micro-climate based on the data received from its local control unit, and individually provide control signals to one or more of the local control units when one or more of the local conditions at its respective micro-climate falls outside the respective thresholds, to automatically alter and/or maintain the desired soil profile temperatures and/or moisture levels in real-time.

In some embodiments, the central control unit may be configured to provide the respective control signals to particular local control units based on a schedule of operation. The schedule of operation may include one or more user-defined schedules specifying a time and/or order of operation of the sub-soil air flow mechanism and/or in-ground hydronic mechanism coupled to the local control units at the respective micro-climates via a user interface.

In some embodiments, the central control unit may be configured to provide the respective control signals to the local control units to dynamically alter future scheduled operation of the sub-soil air flow mechanism and/or in-ground hydronic mechanism underlying the green surface at its respective micro-climate based on current or real-time operation, for example, by delaying a heating or cooling operation scheduled for a future time based on an intervening unscheduled heating or cooling operation.

In some embodiments, the central control unit may be configured to predictively alter the scheduled operation based on the real-time operation and/or sensor data, for example, by automatically scheduling or removing scheduled system operation based on a predicted rate of change of the current soil profile temperature(s) according to the real-time sensor data.

According to some embodiments described herein, a turf management system for a multi-climate environment includes a plurality of local control circuits and a central control circuit. The local control circuits include respective communication interfaces that are configured to receive sensor data from environmental sensors that are locally positioned at different green surfaces. The different green surfaces are remote from one another and include respective micro-climates of the multi-climate environment. The central control circuit includes a network interface that is configured to receive data indicating differing local conditions at the respective micro-climates from the local control circuits, and a processor that is configured to aggregate the data indicating the differing local conditions at the respective micro-climates for output to a user interface.

In some embodiments, the local control circuits may include respective processors that are coupled to the respective communication interfaces The respective processors may be configured to convert the sensor data into the data indicating the differing local conditions according to a predetermined format, and transmit the data indicating the differing local conditions at the respective micro-climates to the central control circuit.

In some embodiments, the local control circuits may be configured to be coupled to and to control operation of respective subsurface turf management mechanisms that are locally positioned at the different green surfaces responsive to respective user inputs received via respective local user interfaces thereof, and/or responsive to respective control signals received from the central control circuit.

In some embodiments, the respective communication interfaces of the local control circuits may be configured to receive the sensor data from the environmental sensors via a first communication network. The network interface of the central control circuit may be configured to receive the data indicating the differing local conditions at the respective micro-climates via a second communication network that is different from the first communication network.

In some embodiments, the local control circuits may include respective network interfaces that are configured to receive the data indicating the differing local conditions at one of the respective micro-climates from another of the local control circuits via the second communication network, and relay the data indicating the differing local conditions at the one of the respective micro-climates to the central control circuit via the second communication network.

According to further embodiments described herein, a central control circuit for turf management of a multi-climate environment includes a network interface that is configured to receive data indicating differing local conditions at respective micro-climates of the multi-climate environment from local control circuits that are positioned at or near different green surfaces that are remote from one another. The data indicating the differing local conditions at the respective micro-climates is based on sensor data received from environmental sensors that are locally positioned at the different green surfaces. The central control circuit further includes a processor coupled to the network interface and configured to aggregate the data indicating the differing local conditions at the respective micro-climates for output to a user interface.

In some embodiments, the processor may be further configured to generate respective control signals and transmit the respective control signals to one or more of the local control circuits via the network interface responsive to receiving the data indicating the differing local conditions at the respective micro-climates.

In some embodiments, the processor may be configured to transmit the respective control signals based on differences in reception of the data from the local control circuits. The respective control signals may be configured to control the one or more of the local control circuits to relay the data indicating the differing local conditions at one of the respective micro-climates from another of the local control circuits.

In some embodiments, the respective control signals may be configured to control the one or more of the local control circuits to alter operation of respective subsurface turf management mechanisms that are coupled thereto based on the data indicating the differing local conditions at the respective micro-climates.

In some embodiments, the processor may be configured to receive respective user-defined thresholds for soil temperature and/or moisture level of one or more of the respective micro-climates via the user interface, and transmit the respective control signals to the one or more of the local control circuits in real-time when the differing local conditions at the one or more of the respective micro-climates falls outside the respective user-defined thresholds.

In some embodiments, the respective control signals may be configured to control the one or more of the local control circuits to alter the operation of the respective subsurface turf management mechanisms coupled thereto to increase consistency of soil temperature and/or moisture level among the respective micro-climates.

In some embodiments, the processor may be configured to transmit the respective control signals to the one or more of the local control circuits based on a schedule of operation specifying times and/or order of operation of the respective subsurface turf management mechanisms coupled thereto.

In some embodiments, the processor may be configured to transmit the respective control signals to the one or more of the local control circuits to alter future scheduled operation of the respective subsurface turf management mechanisms coupled thereto based on the data indicating the differing local conditions from at least one other of the local control circuits and a predicted rate of change based thereon.

In some embodiments, the local conditions may include local environmental conditions at the respective micro-climates, and/or local operating conditions of respective subsurface turf management systems that are locally positioned at the different green surfaces.

In some embodiments, the local control circuits may be configured to receive the sensor data from the environmental sensors via a first communication network, and the network interface of the central control circuit may be configured to receive the data indicating the differing local conditions at the respective micro-climates via a second communication network that is different from the first communication network.

According to still further embodiments described herein, a computer program product for turf management of a multi-climate environment includes computer readable program code that, when executed by a processor, causes the processor to perform operations. The operations include receiving, via a network interface, data indicating differing local conditions at respective micro-climates of the multi-climate environment at different green surfaces that are remote from one another, where the data is based on sensor data from environmental sensors that are locally positioned at the different green surfaces, and displaying, via a user interface, the data indicating the differing local conditions at the respective micro-climates.

In some embodiments, the data may be received from a central control circuit that is communicatively coupled to local control circuits via a first communication network. The local control circuits may be positioned at or near the different green surfaces, and the local control circuits may be communicatively coupled to the environmental sensors via a second communication network that is different from the first communication network.

In some embodiments, the operations may further include receiving, via the user interface, user input corresponding to one or more of the respective micro-climates, and transmitting, via the network interface, signals indicative of the user input to the central control circuit.

In some embodiments, the user input may include respective user-defined thresholds for soil temperature and/or moisture levels of the one or more of the respective micro-climates. The operations may further include providing, via the user interface, one or more indicators for the one or more of the respective micro-climates having soil temperature and/or moisture levels that fall outside the respective user-defined thresholds.

In some embodiments, the operations may further include displaying, via the user interface, a schedule of operation for respective subsurface turf management mechanisms. The respective subsurface turf management mechanisms may be locally positioned at the different green surfaces and coupled to the local control circuits at or near the different green surfaces, respectively. The user input may specify times and/or order of operation of one or more of the respective subsurface turf management mechanisms corresponding to the one or more of the respective micro-climates.

BRIEF DESCRIPTION OF THE DRAWINGS

FIGS. 5A-5G illustrate example graphical user interfaces displaying local condition data provided by environmental sensors and/or turf management mechanisms installed in or on respective green surfaces of a multi-climate sporting event operating environment for centralized monitoring and control of turf management systems in accordance with some embodiments described herein.

FIGS. 8A-8E are various views of a local control unit in accordance with embodiments described herein.

DETAILED DESCRIPTION OF EMBODIMENTS

Embodiments described herein may arise from realization that some grass plant environments, such as those used for sporting events, may include multiple grassy areas (also referred to herein as a "green surfaces" or "turf") that are exposed to differing and continuously varying environmental conditions, even if located in a common geographical area. For example, respective green surfaces at the different holes of a golf course may experience different climate conditions, for instance, based on tree cover, sun exposure, elevation, contour, etc. Likewise, different portions of a green surface in a football stadium may be exposed to different sunlight and/or airflow conditions. Such multi-climate environments may make turf management more challenging.

Accordingly, some embodiments described herein provide turf management systems, devices, and methods of operation that are configured to maintain desired and/or more consistent subsurface conditions for multiple green surfaces at different localities of the environment, referred to herein as micro-climates, based on detection of changing or continuously-varying environmental conditions at the different micro-climates, as well as based on static conditions (e.g., respective topographies and/or drainage conditions) of each micro-climate or the associated green surface. Embodiments described herein may thereby allow for improvement and/or optimization of growth conditions for the grass plants at the multiple green surfaces, protecting the grass plants from damage and also providing a more consistent green surface for players in a sporting event.

Figure 1:
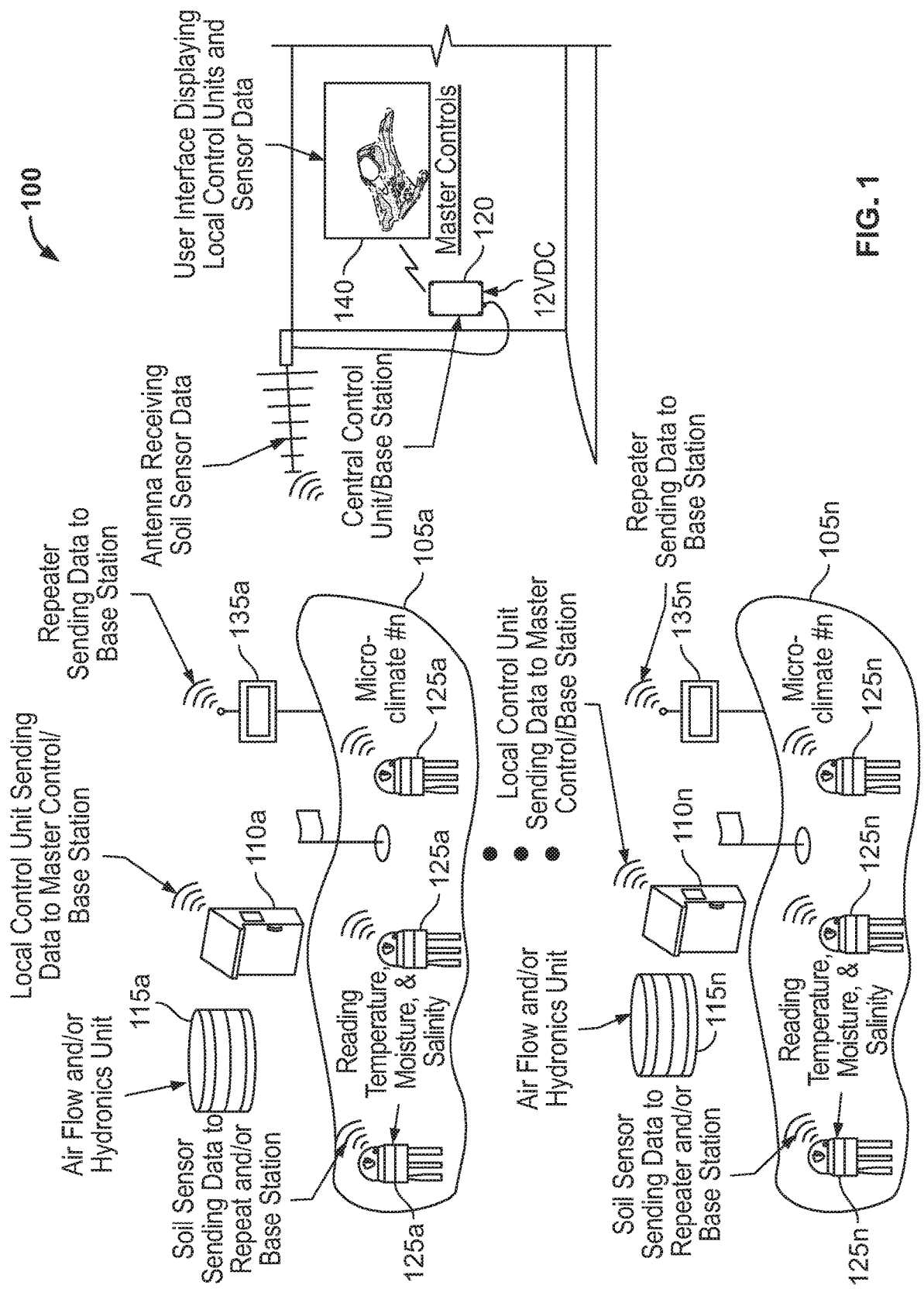
FIG. 1 is a system diagram illustrating an example turf management system for multi-climate environments that include green surfaces exposed to different environmental conditions in accordance with some embodiments described herein.

FIG. 1 is a system diagram illustrating an example turf management system 100 in accordance with some embodiments described herein. As shown in FIG. 1, a multi-climate environment includes multiple green surfaces at different localities of the environment, referred to herein as micro-climates 105a to 105n (generally referred to herein as "105"). The turf management system 100 includes a plurality of local control units or circuits 110 to 110n (illustrated as local control panels; generally referred to herein as "110") for each micro-climate, and a central or master control unit or circuit 120 (illustrated as a base station coupled to a remote display device or screen 140) that is communicatively coupled to each of the local control units 110 via a wired and/or wireless network interface. Each local control unit 110 may be coupled to a respective subsurface turf management mechanism 115a to 115n (which may include a sub-soil air flow mechanism and/or in-ground hydronic mechanism; generally referred to herein as "115") underlying the green surface at its respective micro-climate 105, and may be configured to monitor and control operation of its respective subsurface turf management mechanism 115 in real-time.

More particularly, the turf management system 100 includes one or more environmental sensors 125a to 125n (generally referred to herein as "125") on and/or in the green surface at each micro-climate 105. The environmental sensors 125 are illustrated in FIG. 1 as in-ground wireless sensors (which may be less susceptible to damage from green maintenance operations than wired sensors), but above-ground, wired, and/or other types of sensors may also be used, alone or in combination. The environmental sensors 125 may be distributed in multiple zones of and/or at multiple depths below the green surface of each micro-climate 105, and may be configured to detect and transmit data indicating one or more local conditions, including soil temperatures, moisture, salinity, and/or oxygen levels, to the local control unit 110 for the respective micro-climate 105 via a local network protocol or interface. The local control unit 110 of each micro-climate 105 is thereby configured to control operation of a sub-soil air flow mechanism and/or in-ground hydronic mechanism 115 underlying the green surface at its respective micro-climate 105 in real-time, to individually alter and/or maintain the soil profile temperatures and/or moisture levels at its respective micro-climate 105.

The local control unit 110 of each micro-climate 105 is further configured to convert the sensor data from the environmental sensors 125 into a predetermined or desired format, and communicate the data indicating the local conditions at its respective micro-climate 105 to the central control unit 120 via a wired and/or wireless central network protocol or interface, in real-time. The turf management system 100 may also include or more repeater units 135a to 135n (generally referred to herein as "135") that are configured to receive and relay the sensor data from the environmental sensors 125 of one or more micro-climates 105 to the central control unit 120, for example, as needed based on the associated green surface or course topography and/or transmission distances. In some embodiments, the repeater unit 135 may be integrated in a local control unit 110, such that the local control unit 110 may be configured to provide a repeater functionality by receiving data from another local control unit 110 positioned at a different micro-climate 105 of the environment (e.g., farther from the central control unit 120), and relaying the data indicative of local conditions at the other micro-climate 105 to the central control unit 120 via the network.

The local control units 110, the central control unit 120, and the repeater units 135 (where utilized) thus define a central communication network. In some embodiments, the central communication network between the local control units 110/repeaters 135 and the central control unit 120 may utilize a different communication standard or protocol than that used by the respective local communications networks between the local control units 110 and the corresponding environmental sensors 125, with the local control units 110 performing conversion between the different communication standards/protocols.

The central control unit 120 is configured to monitor and manage operation of each local control unit 110 based on the sensor data provided by the environmental sensors 125 from the corresponding micro-climate 105 as described herein. For example, the central control unit 120 may be configured to aggregate the data indicating the local conditions for the respective micro-climates 105 and provide the aggregated data as an output for display via a user interface 140 (illustrated as a display device), to allow simultaneous viewing of different and/or varying conditions at each micro-climate 105 in real-time. The central control unit 120 may be further configured to log data from the environmental sensors 125 of each micro-climate 105 over respective time intervals and generate historical data plots to provide a graphical representation of the impact of agronomic practices, natural phenomena, and weather events on turf conditions at each micro-climate 105.

The central control unit 120 may also be configured to monitor communications from the local control units 110 and control routing of network traffic/data to and/or from the local control units 110 based on the monitoring. In some embodiments, the central control unit 120 may provide control signals to one or more of the local control units 110 to relay data through one or more other of the local control units 110 based on detection of differences and/or inaccuracies in transmission/reception of the data from the one or more of the local control units 110, for instance, due to signal interference (e.g. due to poor weather conditions) and/or malfunction.

The central control unit 120 may be further configured to generate and transmit respective control signals to individual local control units 110 to operate the corresponding subsurface turf management mechanism 115 (e.g., sub-soil air flow mechanism and/or in-ground hydronic mechanism) underlying the green surface at its respective micro-climate 105 based on the real-time data indicating its local environmental conditions as collected by the corresponding environmental sensors 125. That is, each local control unit 110 may be configured to operate its respective subsurface turf management mechanism 115 responsive to a control signal received from the central control unit 125. The central control unit 125 may be configured to provide the respective control signals to the corresponding local control units 110 responsive to user input via a user interface (which may be the same device or a different device than the display device 140), and/or automatically based on the local conditions relative to one or more predetermined or preset thresholds. For example, respective user-defined thresholds for soil temperature and/or moisture level ranges may be specified for one or more of the micro-climates via a user interface, and the central control unit 120 may individually provide control signals to one or more of the local control units 110 when one or more of the local conditions at its respective micro-climate 105 falls outside the respective thresholds, to alter and/or maintain desired soil temperatures and/or moisture levels at its respective micro-climate. That is, the local control units 110 may control operation of the respective subsurface turf management mechanisms 115 at their respective micro-climates 105, and the central control unit 120 may allow for centralized monitoring and management of operation of the local control units 110 to maintain desired and/or more consistent sub-soil conditions among the micro-climates 105 of an operating environment.

Figure 2A:
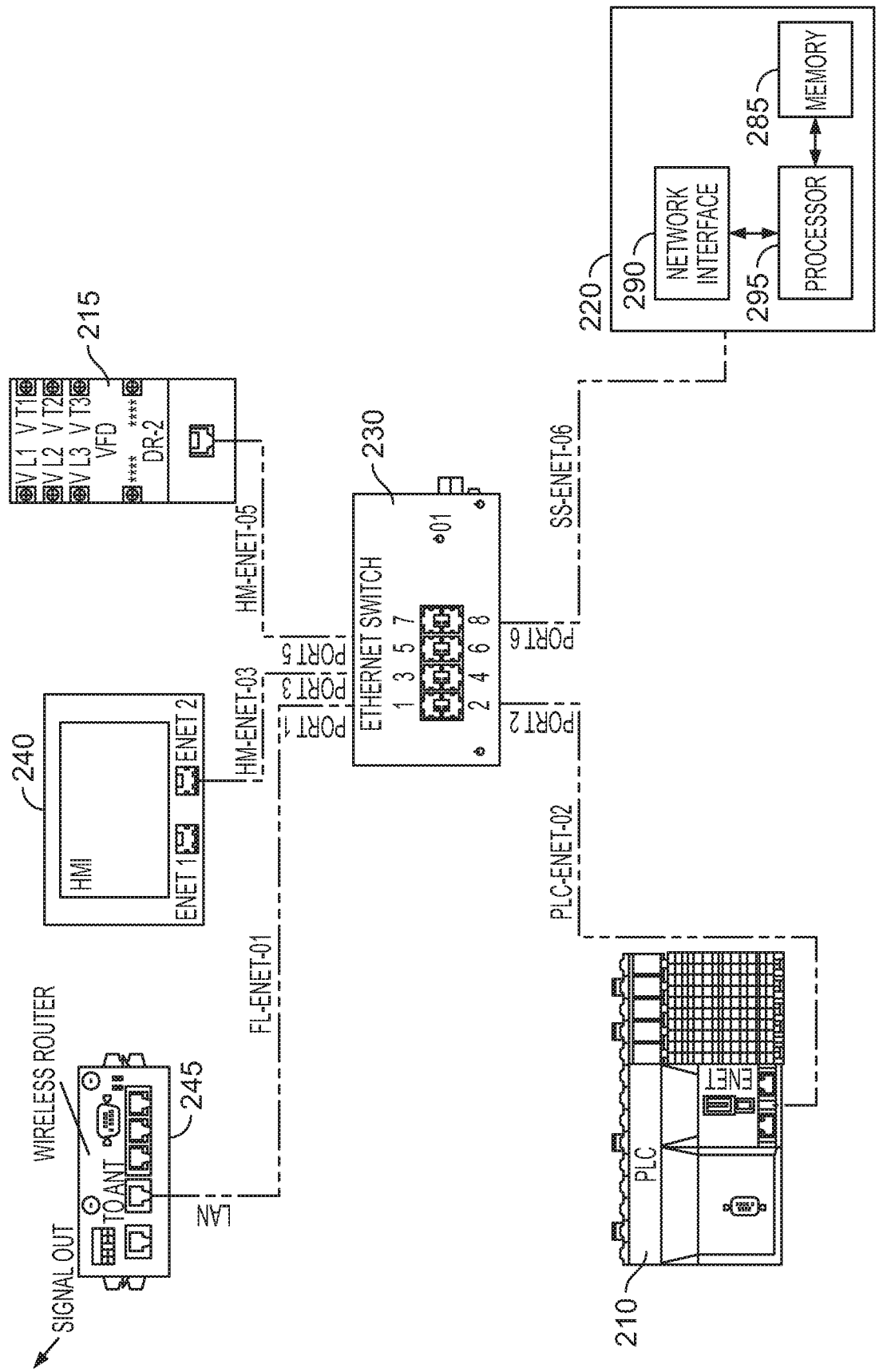
FIGS. 2A and 2B illustrate example connections between components of a local control unit or circuit and a central control unit or circuit in accordance with embodiments described herein.
Figure 2B:
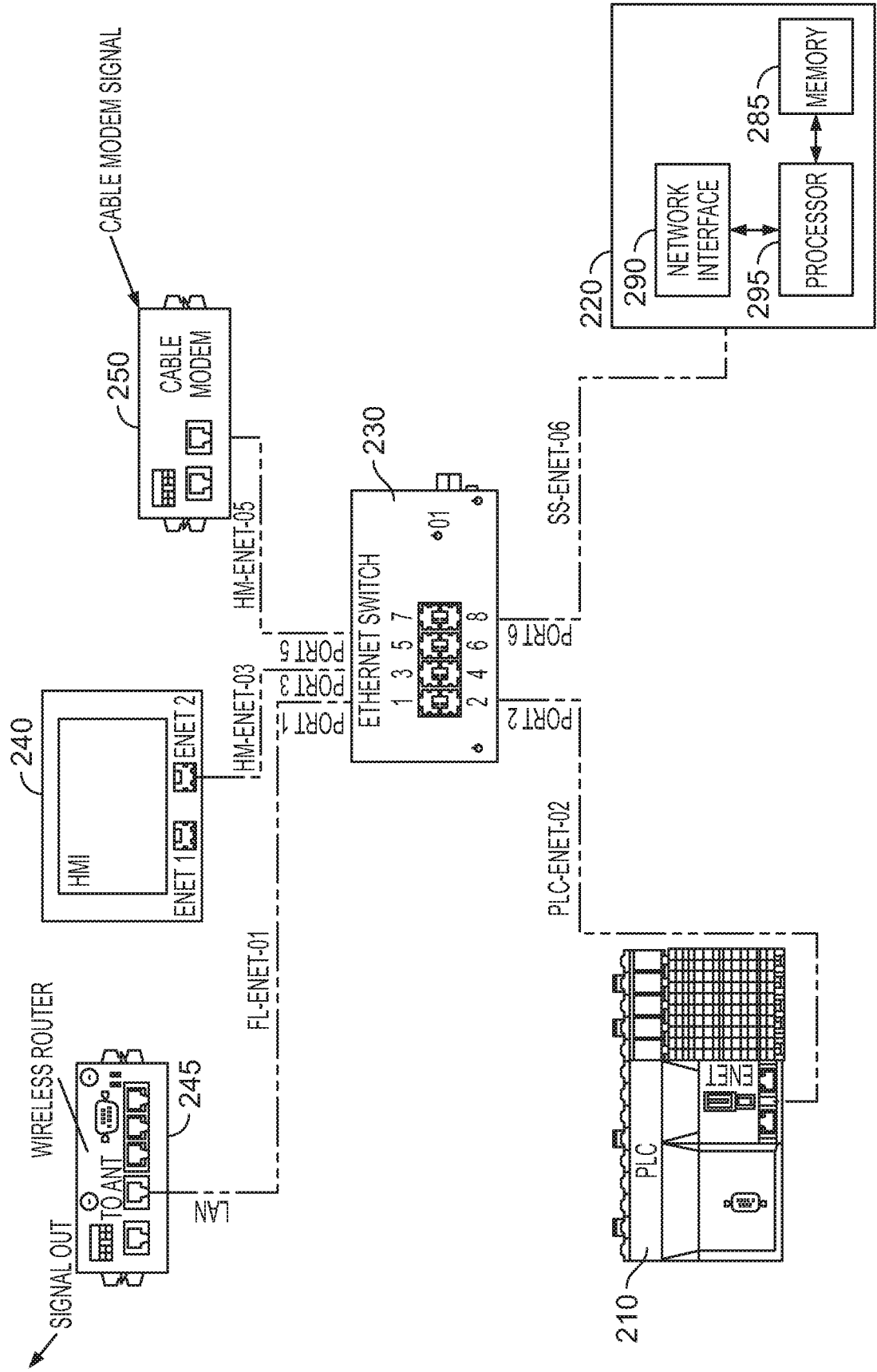

FIGS. 2A and 2B illustrate example connections between components of a local control unit 210 and a central control unit 220 in accordance with embodiments described herein. The central control unit 220 and the local control unit 210 may represent the central control unit 120 and one of the local control units 110 of FIG. 1, respectively. As shown in FIGS. 2A and 2B, the central control unit 220 may include a processor 295, a memory 285, and a network interface 290 (more generally referred to herein as a central control circuit) that are configured to execute operations to provide some or all of the functionality of the central control unit 220 described herein. The local control unit 210 may include a programmable logic controller (PLC) or other processing unit (more generally referred to herein as a local control circuit or controller) that is configured to execute operations to control some or all of the functionality of the local control unit 210 described herein. The local controller 210 may be communicatively coupled to a local human-machine interface (HMI) 240 (also referred to herein as a local user interface), a wireless signal router 245, a sub-soil air flow control 215 (illustrated as a variable frequency drive (VFD) for a blower system) and/or control for an in-ground hydronic mechanism, and/or a modem 250, via an ethernet switch 230 that provides a communication interface with the central control unit/base station 220. The wireless router 245 may be configured for communication with the local environmental sensors (e.g., the sensors 125 of FIG. 1) on and/or in the green surface of the corresponding micro-climate. The local controller 210 may thereby receive sensor data indicating local conditions from the local environmental sensors, and may convert the sensor data to a desired format (e.g., a Modbus-based protocol, such as Modbus TCP/IP) for transmission to the central control unit 220 via the network interface 290. The processor 295 of the central control unit 220 may be configured to execute program code stored in the memory 285 to perform operations described herein to monitor and/or aggregate data indicative of the local conditions at the respective micro-climates received data from the corresponding local controllers 210, and to output respective control signals to the local controllers 210 to control operation thereof (and/or operation of subsurface turf management mechanisms coupled thereto). The modem 250 may be configured for communication with a wide area network, for example, to allow for viewing of the local conditions via a remote display, such as the screen of a smartphone, tablet, or remote computer.

Figure 3:
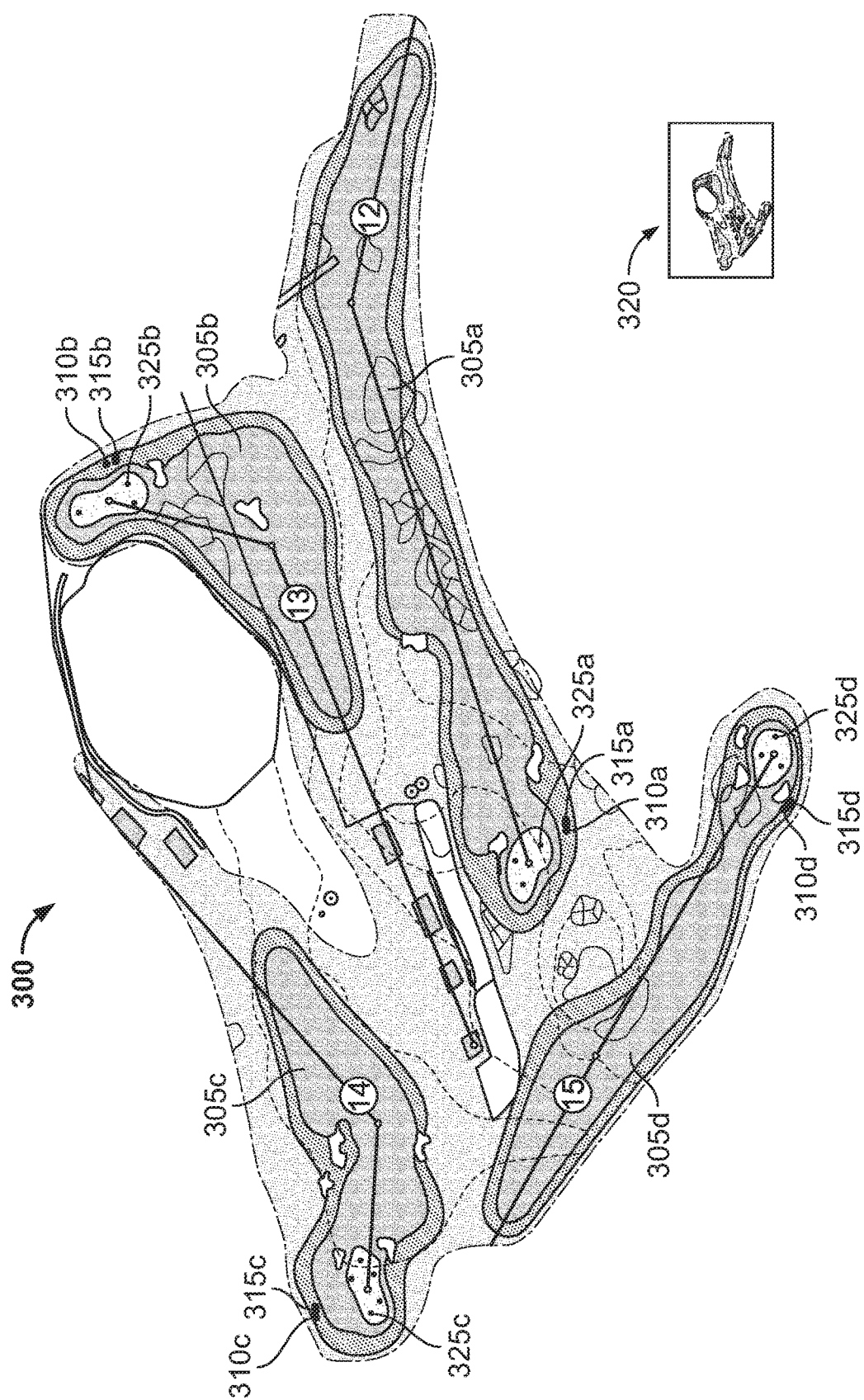
FIG. 3 is a plan view illustrating elements of an example turf management system installed in a golf course operating environment including multiple green surfaces exposed to different environmental conditions in accordance with some embodiments described herein.

FIG. 3 is a plan view illustrating elements of an example turf management system 300 installed in a golf course operating environment in accordance with some embodiments described herein. As shown in FIG. 3, a golf course includes multiple micro-climates 305a, 305b, 305c, and 305d that are exposed to different environmental conditions, illustrated by way of example as the remote green surfaces (including fairways and putting greens) for holes 12, 13, 14, and 15 of a golf course, respectively. Each green surface includes multiple in-ground wireless sensors 325a, 325b, 325c, 325d placed at one or more depths within the underlying soil profile, which are communicatively coupled with a respective local control unit 310a, 310b, 310c, 310d via a wireless local network. The green surfaces shown in FIG. 3 include wireless sensors 325a, 325b, 325c, 325d that are located or positioned beneath the putting green and local control units 310a, 310b, 310c, 310d in rough areas, but it will be understood that other wireless sensor locations (e.g. throughout the fairway) and/or local control unit locations may be provided. In the example of FIG. 3, each local control unit 310a, 310b, 310c, 310d includes a control panel/user interface and integrated repeater functionality, and is coupled to a local subsurface turf management mechanism 315a, 315b, 315c, 315d (such as a local sub-soil air flow mechanism and/or in-ground hydronic mechanism) underlying the corresponding green surface. That is, in the example of FIG. 3, each green surface includes its own dedicated and independently operable subsurface turf management mechanism 315a, 315b, 315c, 315d (each of which may represent a subsurface turf management systems 115, 215 discussed herein). The local control units 310a, 310b, 310c, 310d (each of which may represent a local control unit 110, 210 discussed herein) are communicatively coupled via a wireless ethernet converter and gateway to a central or master control unit 320 (which may represent a central control unit 120, 220 discussed herein). The central control unit 320 is illustrated in the example of FIG. 3 as a centrally located master control base station in a permanent structure that is local to the golf course (e.g., a clubhouse or maintenance building).

Figure 4A:
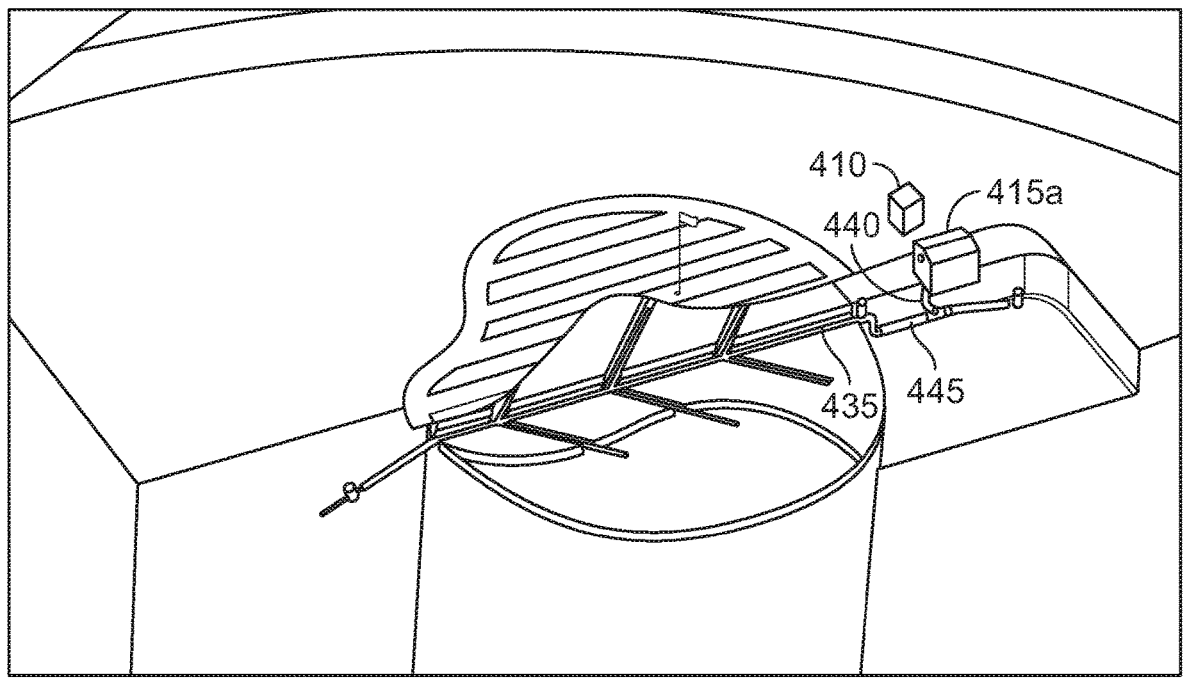
FIGS. 4A and 4B are cutaway perspective views illustrating elements of an example turf management system installed in one green surface of a golf course operating environment in accordance with some embodiments described herein.
Figure 4B:
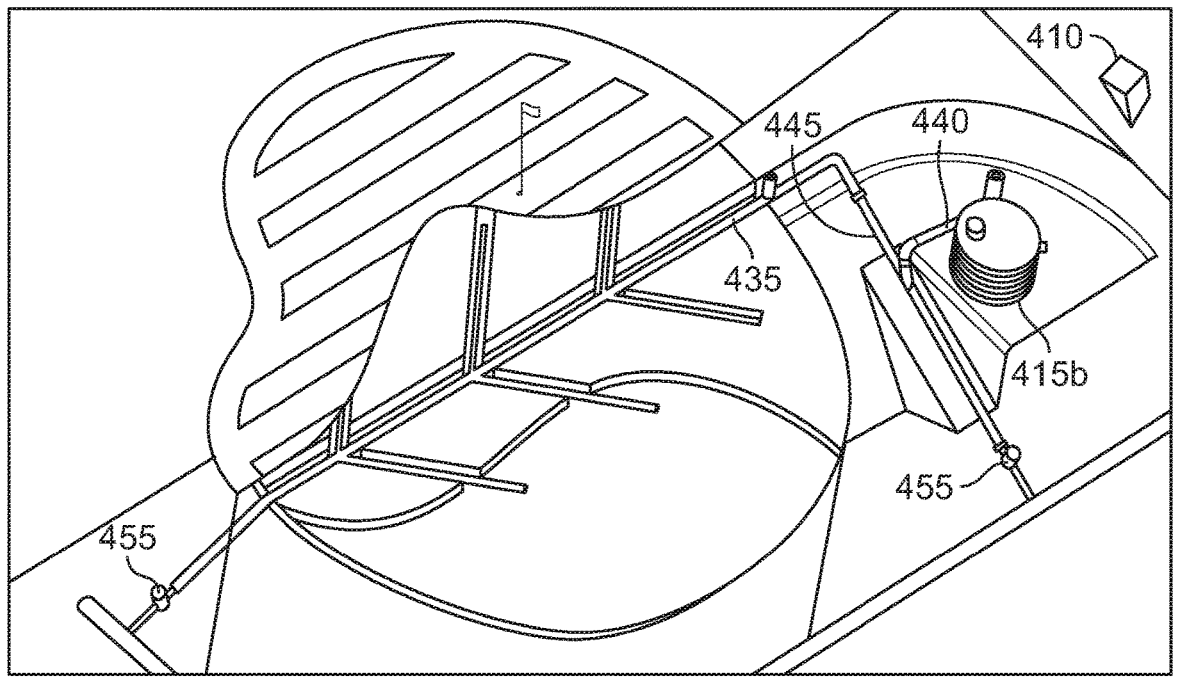

FIGS. 4A and 4B are cutaway perspective views illustrating elements of an example turf management system installed in one of the green surfaces of a golf course operating environment, such as one of the green surfaces for holes 12, 13, 14, and 15 of FIG. 3. As shown in FIGS. 4A and 4B, a local control unit 410 (illustrated as a freestanding desk-type console) is communicatively coupled with a turf management vault unit (illustrated as an above-ground blower unit 415a in FIG. 4A, and as a below ground blower unit 415b in FIG. 4B), both of which are positioned in unobtrusive locations relative to a putting green. The local control unit 410 may represent a local control unit 110, 210, 310a-310d discussed herein. Likewise, the blower unit 415a, 415b may represent a subsurface turf management mechanism 115, 215, 315a-315d discussed herein.

As shown in detail in FIGS. 4A and 4B, the blower unit 415a, 415b is connected to an in-ground drainage network 435 via an air line 440, and moves air through a pre-existing drainage pipe network in and/or below the soil profile, utilizing the perforated drainage pipes to access the soil profile. In particular, the main drainage collector is intercepted by an air line 440 that connects to an air-water separator 445 installed between the green and the blower. In the examples of FIGS. 4A and 4B, the blower unit 415a, 415b is configured to provide both vacuum mode operation (to pull water from the surface and through the soil) and pressure mode operation (to force air from the subsoil pipes through the soil profile), and is housed in a vault located away from the green. In these examples, a distributed separator 445 is connected to the green's drainage network 435 to separate the air from the water so that the air flows to the vault unit 415a, 415b and the water drains to the outfall. A dual valve 455 may be used on the end of each outfall to create an air lock, which directs the air through the soil profile so it does not escape through an open-ended pipe.

The local control unit 410 is configured to activate the vacuum mode of the blower unit 415a, 415b to apply a vacuum within the subsoil drainage pipe network 435 to increase the rate at which water is moved from the surface and through the soil profile. This can reduce or remove standing water in a short amount of time, reduce or remove non-capillary water from the soil profile, and introduce fresh air into the root zone. For example, the vacuum mode can be used to remove standing water from the green surface to speed drying for a sporting event. The management of subsoil moisture can also aid temperature moderation in the entire soil profile. The local control unit 410 is configured to activate the pressure mode of the blower unit 415a, 415b to inject fresh air into the soil profile, for example, during stressful events or extreme temperatures (hot or cold). The blower unit 415a, 415b can be controlled by the local control unit 410 to run in pressure mode to continuously inject fresh air into the profile if the green surface is temporarily covered. In some embodiments, the local control unit 410 may be configured to operate the blower unit 415a, 415b to operate in vacuum mode or pressure mode responsive to control signals received from a central control unit, such as the central control unit 120, 220, 320 discussed herein.

FIGS. 4A and 4B are illustrated with reference to turf management mechanisms based on a blower system 415a, 415b and associated sub-soil pipe network 435 by way of example, but it will be understood that embodiments described herein may be similarly applied to control operation of an in-ground hydronic mechanism, including in-ground tubing coupled to above-ground tanks and/or pumps, based on the sensor data provided by the environmental sensors. For example, hydronic mechanisms in accordance with some embodiments described herein may include a boiler (for heating a fluid, such as water), a chiller (for cooling the fluid), a chiller pump, a green pump, and a holding tank, which may be housed in an enclosure and connected to in-ground hydronic tubing. The hydronic tubing may be buried in the soil profile at a depth sufficient to avoid damage from green maintenance operations, for example, at a depth of about 8 to 10 inches or more, and may circulate heated or cooled fluid responsive to operation of the pumps. Based on the temperature signals from the in-ground wireless sensors and the desired soil profile temperature, the local control unit 410 may be configured (in some instances, responsive to control signals from a central control unit) to operate the in-ground hydronic mechanism to provide heated or cooled air to the root zone. That is, the circulation and temperature of the fluid in the hydronic tubing can be controlled at each micro-climate by the respective local control unit 410 (and/or a central control unit that is coupled to multiple local control units) responsive to sensor data indicated by the wireless signals received from the in-ground wireless sensors at that micro-climate.

Further embodiments described herein may be configured to control both sub-soil air flow mechanisms and in-ground hydronic mechanisms at each micro-climate in cooperation. In particular, based on the local conditions detected and reported by the in-ground wireless sensors, the central and/or local control units may be configured to operate the blower to expedite the activity of hydronic-based cooling and/or radiant heating systems. By operating the blower in the pressure mode, air can be drawn through the exhaust pipe and is pushed through the perforated sub-soil drainage pipes, past the hydronic tubing (to heat or cool the air), through the soil profile, and into the root zone. This creates air movement that more evenly distributes the heating or cooling effects of the hydronic tubing, providing aeration while moderating temperature in the root zone. That is, the blower and the hydronic mechanism can be cooperatively operated by central and/or local control units described herein to apply pressure to force air into the underlying sub-soil drainage pipes and through the holes therein, along and/or around the hydronic tubing containing the circulating heated or cooled fluid (to heat or cool the air), and into the root zone in the overlying soil profile. In some embodiments, up to 120 degrees Fahrenheit or more of temperature adjustment can be achieved. Cooperative control of sub-soil air flow and in-ground hydronic mechanisms and associated dynamic scheduling operations is further described in U.S. patent application Ser. No. 16/103,498 entitled "WIRELESS SENSOR-BASED TURF HEATING AND COOLING" filed Aug. 14, 2018, the disclosure of which is incorporated by reference herein in its entirety.

Figure 5A:
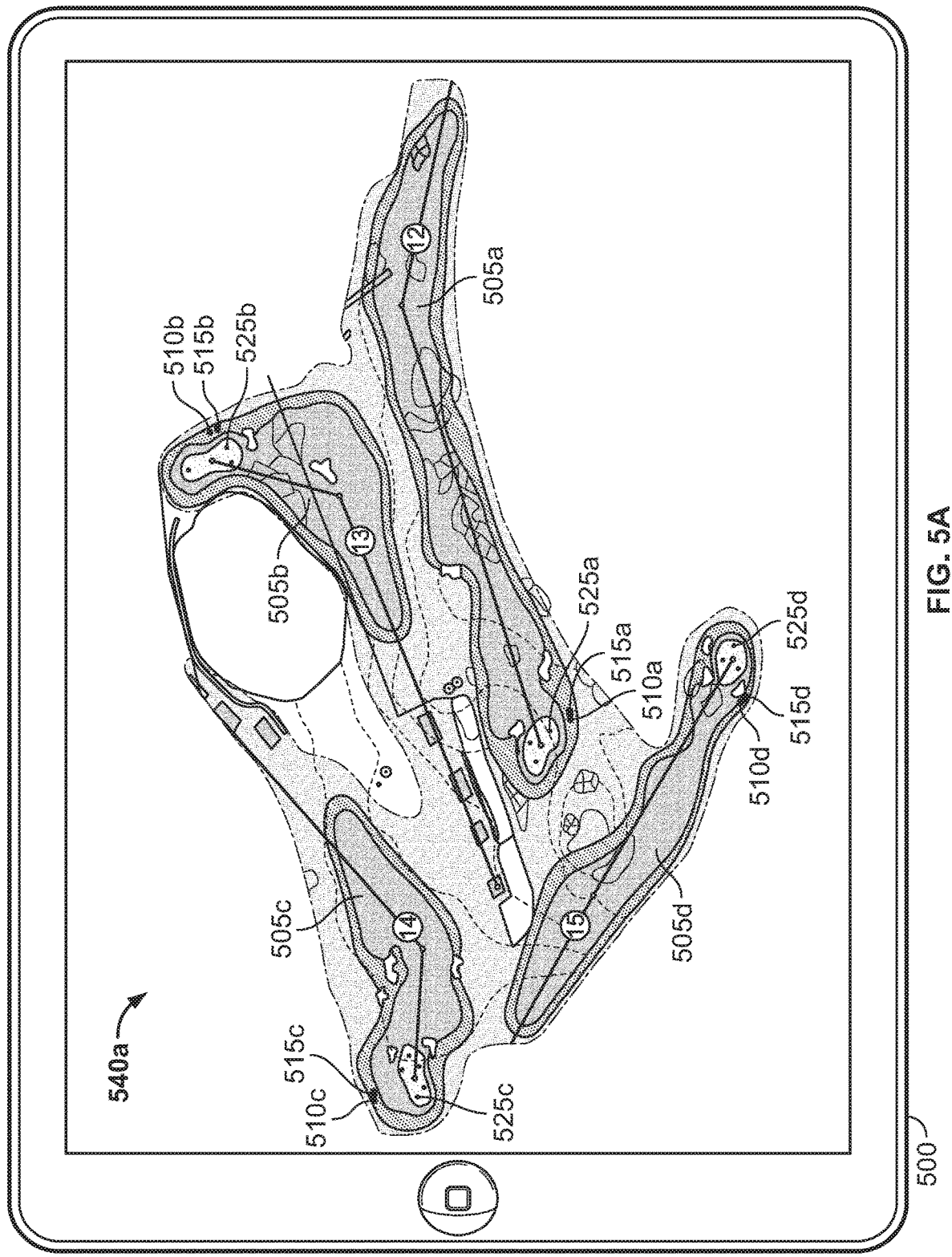

FIGS. 5A-5G illustrate example graphical user interfaces 540a-540g (generally referred to herein as "540") that are configured to display the layout of and local conditions reported by in-ground wireless sensors at respective green surfaces for multiple holes of a golf course. The user interfaces 540a-540g may be provided by a remote display device that is located at a central location in the multi-climate environment (e.g., in a clubhouse or other structure that is remote to the respective green surfaces but local to the golf course) and/or a user interface of a smartphone, tablet, or computer, which is communicatively coupled to the central control unit via a wired and/or wireless interface (generally represented by device 500). As shown in FIG. 5A, the user interface 540a may be configured to display a graphical representation of a part or entirety of the golf course, including the simultaneous display of multiple green surfaces having respective micro-climates 505a, 505b, 505c, 505d (generally referred to herein as "505"). In the example of FIG. 5A, a bird's eye view of the green surfaces (including fairways and putting greens) for holes 12, 13, 14, and 15 of an example golf course are shown; however, fewer or more green surfaces may be simultaneously displayed (e.g., by scrolling, zooming, etc.). The user interface 540a may also display respective locations of local control panels 510a-510d (generally referred to herein as "510"), turf management mechanisms 515a-515d (generally referred to herein as "515"), and environmental sensors 525a-525d (generally referred to herein as "525") at each of the green surfaces. Greater detail with respect to the local conditions for one or more (or all) of the green surfaces may be displayed, for example, responsive to user selection thereof, as shown in FIG. 5B.

FIG. 5B illustrates an example user interface 540b that is configured to display graphical representations of the readings provided by in-ground wireless environmental sensors 525 and/or respective turf management mechanisms 515 at nine green surfaces of a golf course. The environmental sensors 525 are operable to detect and report local conditions, including salinity levels, moisture levels, oxygen levels, and/or temperature of the surrounding soil, in real-time. In the example of FIG. 5B, the local conditions reported by the sensors 525 and respective sub-soil air flow mechanisms 515 at two of the green surfaces (holes 6 and 17) are simultaneously displayed via the user interface 540b; however, local conditions at fewer or more green surfaces (e.g., all 18 putting greens of the golf course) may be simultaneously displayed in accordance with embodiments described herein, for example, responsive to user selection. The user interface 540b of FIG. 5B thus provides a graphical overview of the local environmental conditions and turf management mechanism operating conditions at multiple different micro-climates of the golf course, such that insight as to subsurface conditions and turf management mechanism operation at multiple green surfaces can be viewed simultaneously at a central location and/or via a remote device (illustrated as device 500).

The information displayed by the user interface 540b of FIG. 5B may be used by an operator of the golf course to manage conditions at the different micro-climates based on inputs via the user interface 540b, such as by selecting operation of and/or setting desired thresholds for automatic operation of the local control units 510 and associated turf management mechanisms 515 at each micro-climate 505. The central control unit (e.g., the central control units 120, 220, 320) may transmit respective control signals to the local control units 510 at the different green surfaces responsive to the user inputs. For example, heating and/or cooling of the soil profile may be controlled individually at each micro-climate by differently operating the corresponding air flow mechanism and/or hydronic mechanism 515 based on the average of the data provided by the environmental sensors 525 closest to the corresponding green surface. If readings indicated by one (or a minority) of the environmental sensors 525 appears to be erroneous in comparison with the readings indicated by other (or a majority) of the environmental sensors 525 at a given micro-climate, the readings from such sensor(s) 525 may be discarded from the control algorithm.

In some embodiments, an alarm or other indications of the exceeded threshold(s) and/or a malfunction at one or more of the green surfaces may be presented via the user interface 540b. Embodiments as described herein may thereby be used to detect, indicate, and/or automatically react to potential system failures that may damage the green, if left unchecked, and provide user confirmation of the same (e.g., by illumination of a displayed button, indicator, or other audible and/or visible indication). For instance, the central control unit may monitor and generate an alarm in response to detection of a failure of one or more components at a respective micro-climate 505. An operator can then log on and diagnose the problem via one or more of the user interfaces 540 described herein, either locally (via the local control units 510) or centrally (via the central control unit).

Figure 5C:
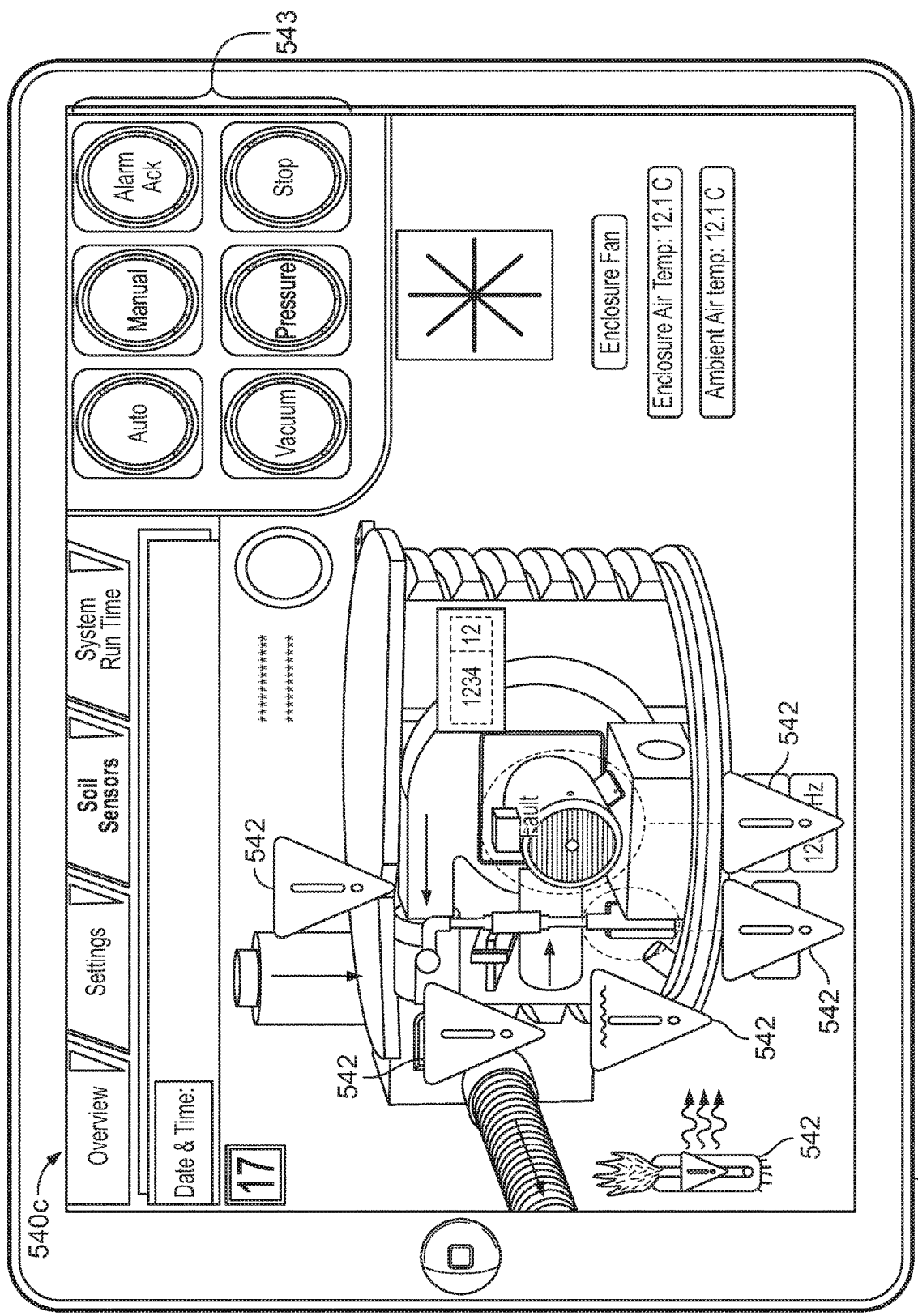
Figure 5D:
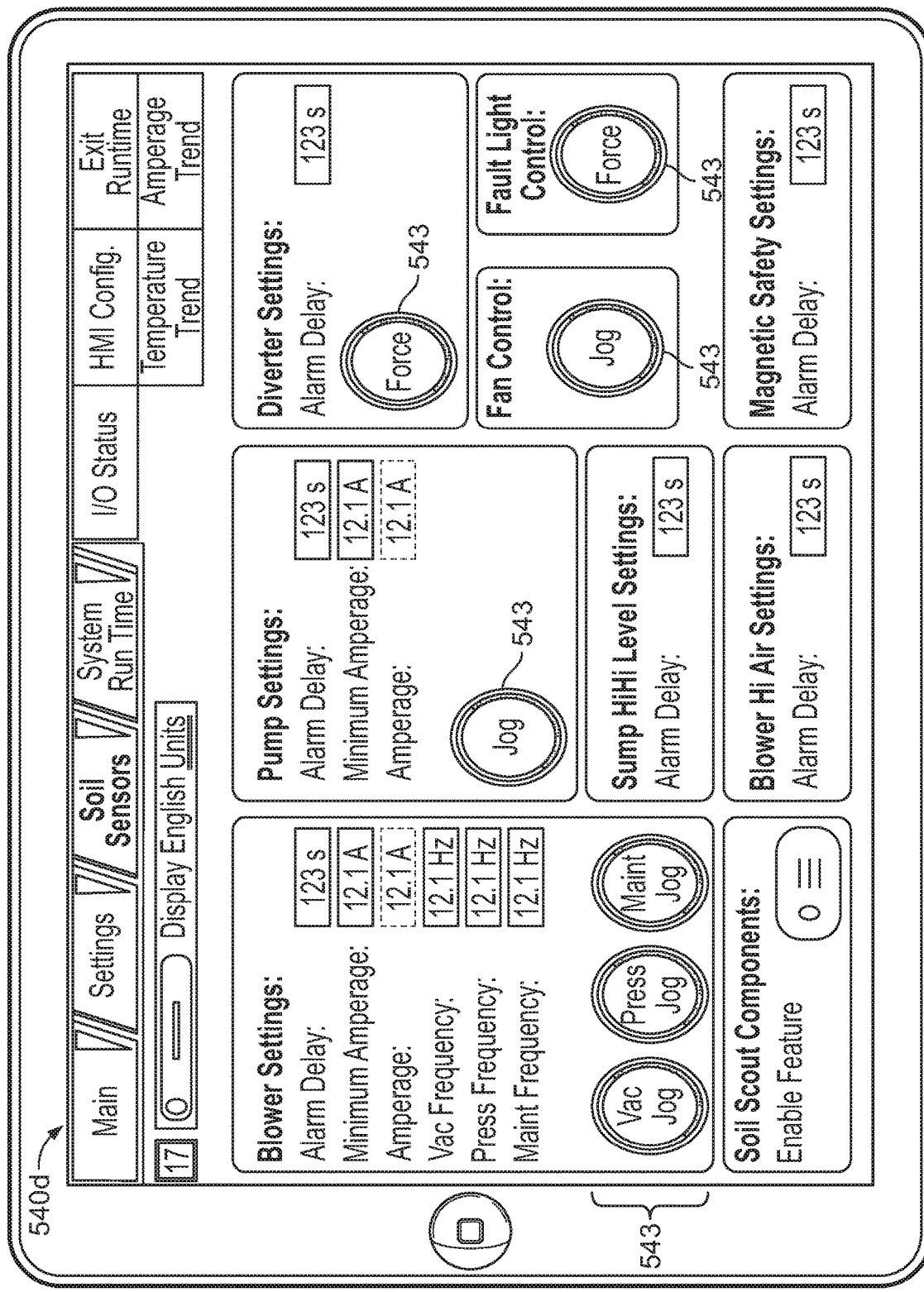
Figure 5E:
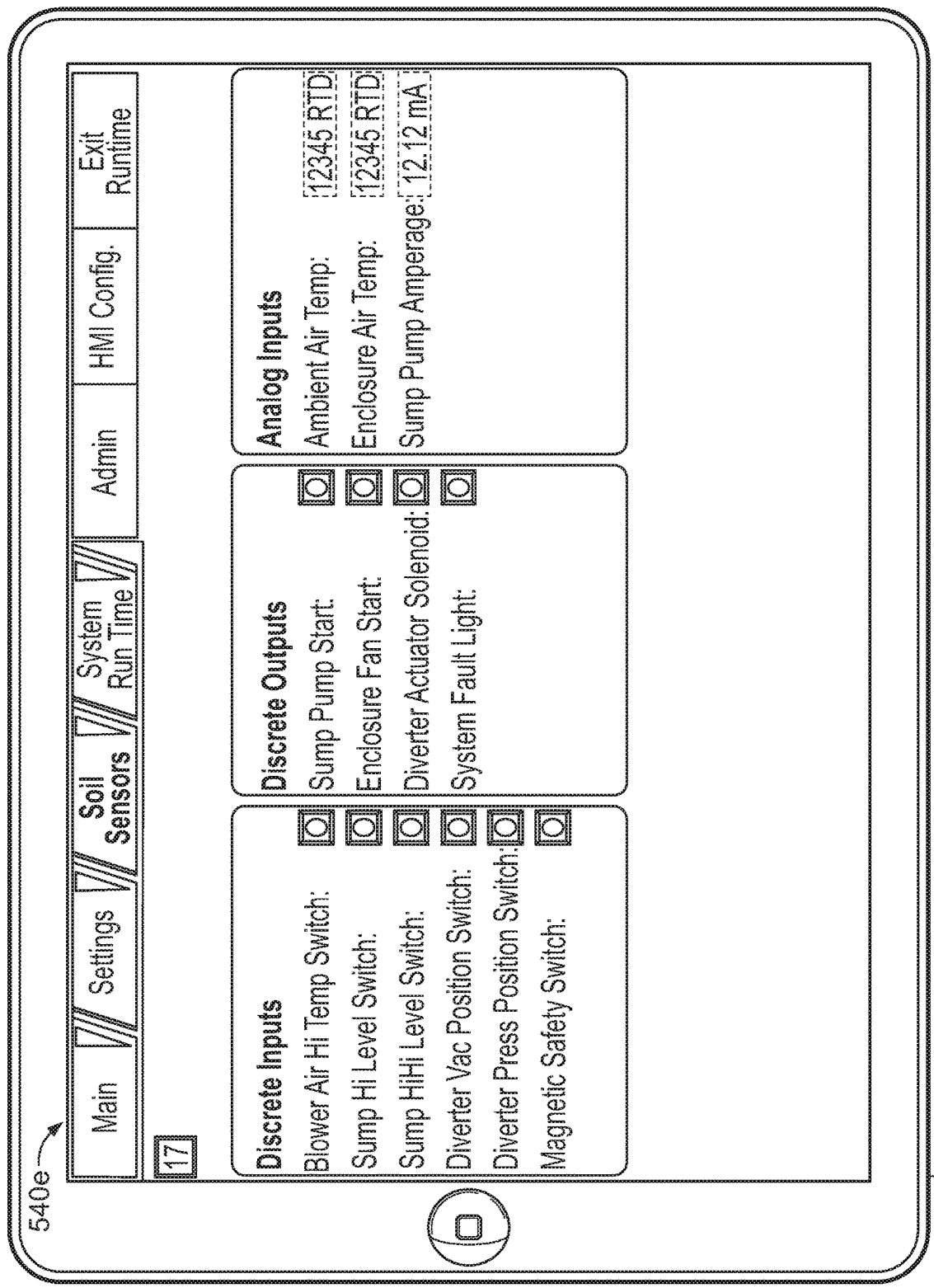
Figure 5F:
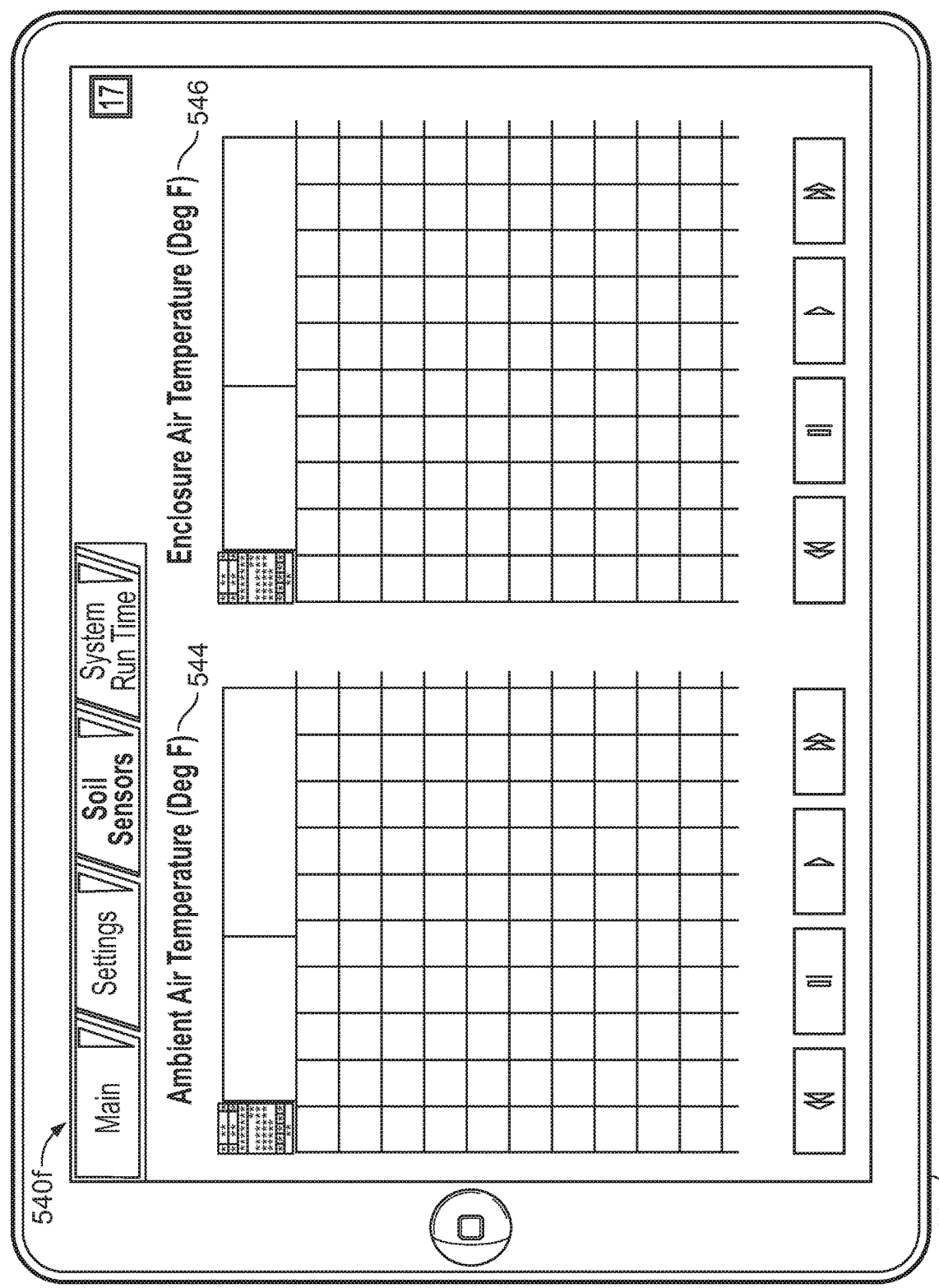
Figure 5G:
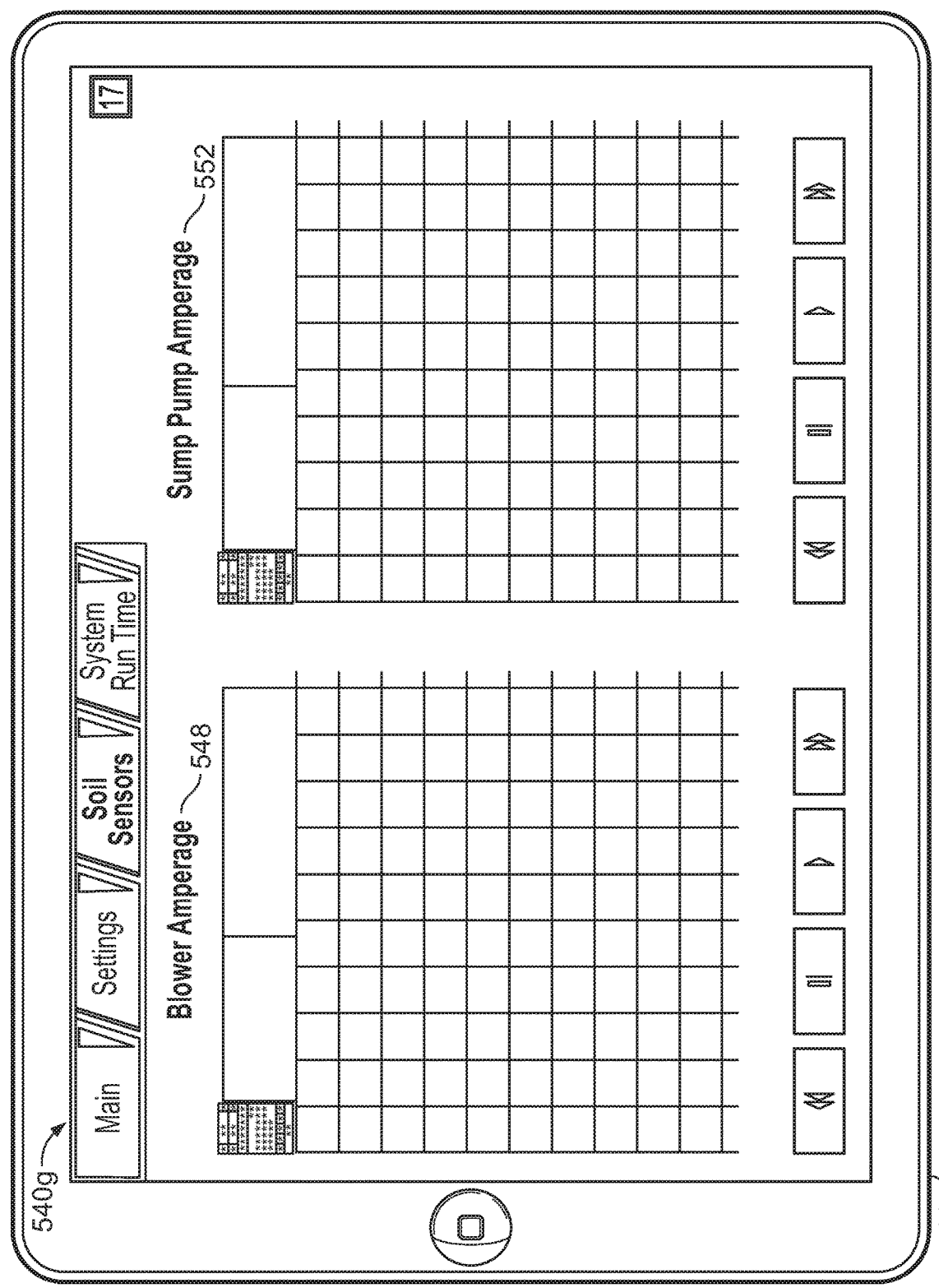

FIGS. 5C-5G illustrate example user interfaces 540c-540g that allow for display and control of operating parameters of the turf management mechanism 515 for a particular green surface, for example, as selected via the user interface of FIGS. 5A and/or 5B. In particular, the user interfaces 540c, 540d, 540e, 540f, and 540g of FIGS. 5C, 5D, 5E, 5F, and 5G illustrate settings and operating parameters of components of a sub-soil air flow system 515, including the blower, pump, diverter, sump, fan, and/or other components, as well as inputs and/outputs thereof, responsive to selection of hole 17. Indications of faults or malfunctions 542 of one or more components, as well as virtual "buttons" 543 that can be used to remotely control and confirm operation of the sub-soil air flow system at the selected green surface, can also be displayed, as shown in the examples of FIGS. 5C and 5D. Historical conditions and/or operating parameters, such as air temperature (e.g., ambient temperature 544 and/or temperature within the air flow system enclosure 546) and electrical amperage (e.g., by the blower 548 and/or by the sump pump 552) over a selected interval of time can also be presented, as shown for example in FIGS. 5F and 5G.

Figure 6A:
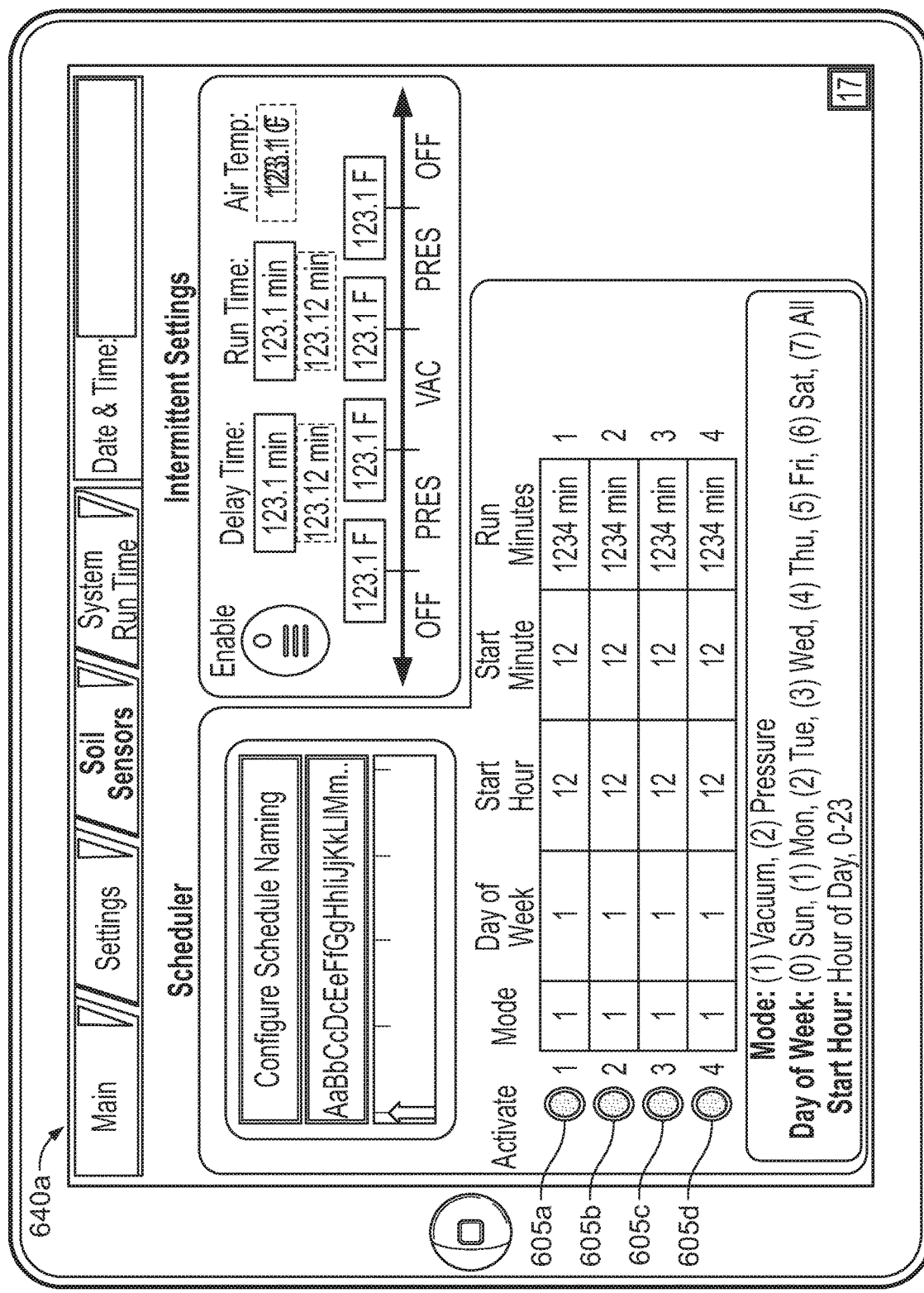
FIGS. 6A and 6B illustrate example graphical user interfaces displaying a scheduling application for controlling operation of turf management systems in accordance with some embodiments described herein.
Figure 6B:
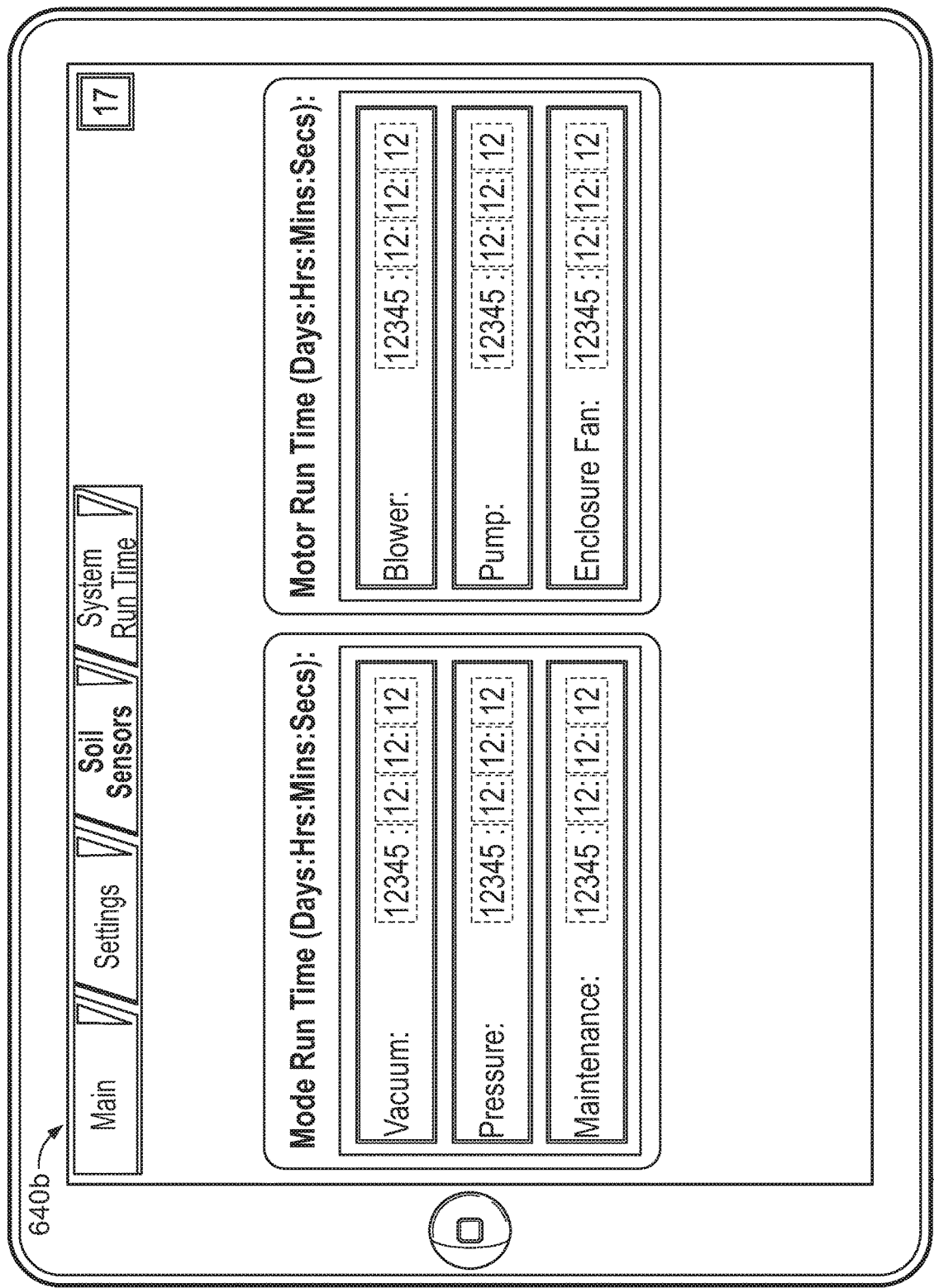

FIGS. 6A and 6B illustrate example user interfaces 640a, 640b (generally referred to herein as "640") for a central scheduling application that is configured to control operation of the sub-soil air flow and/or in-ground hydronic mechanisms (e.g., the subsurface turf management mechanisms 115, 215, 315, 415, 515) at respective micro-climates of a multi-climate operating environment in accordance with embodiments described herein. The user interface 640 may be provided by a remote display device that is located at a central location in the multi-climate environment (e.g., in a clubhouse or other structure that is remote to the respective green surfaces but local to the golf course) and/or a user interface of a smartphone, tablet, or computer, which is communicatively coupled to the central control unit via a wired and/or wireless interface (generally represented by device 600). As shown in FIGS. 6A and 6B, the user interface 640 of the scheduling application is configured to receive user inputs specifying desired operating modes, including aeration/pressure (PRES) settings, moisture removal/vacuum (VAC) settings, temperature settings, and/or intermittent settings for multiple different micro-climates 605a, 605b, 605c, 605d (shown as 4 green surfaces by way of example) as well as the desired start time, run time, and day/date of operation for the respective operating modes at each micro-climate, and provide confirmation of receipt and/or execution of the user inputs. The central control unit (e.g., the central control units 120, 220, 320) may thus transmit respective control signals to the corresponding local control units (e.g., the local control units 110, 210, 310, 410, 510) to operate their respective local turf management mechanisms to achieve the desired settings. Historical data showing actual run time for respective operating modes (e.g., vacuum, pressure, maintenance) and/or respective motors/mechanisms (e.g., blower, pump, enclosure fan) over a desired time interval may also be displayed and monitored via the user interface 640.

In some embodiments, the central scheduling application and central control unit may be configured to dynamically alter one or more stored schedules based on real-time conditions detected by the in-ground wireless sensors at each micro-climate. For example, responsive to automatic operation of the hydronic mechanism to heat the soil profile to a desired temperature in response to detection of an unexpected temperature swing by the in-ground wireless sensors, the central control unit may be configured to determine that one or more previously-scheduled start times and/or run times may be unnecessary to maintain the soil at the desired temperature, and thus, may shift or otherwise alter the start time, run time, and/or day/date, as determined to be sufficient to maintain the desired soil conditions. Similarly, the central control unit may be configured to move up a scheduled start time, run time, and/or day/date of operation of the air flow and/or hydronic mechanisms based on the real-time conditions reported by the wireless sensors. Such dynamic scheduling behavior can also include altering operation of the system for individual micro-climates based on the reported real-time conditions from the wireless sensors at that micro-climate and/or other micro-climates, for example, by transmitting respective control signals to the local control units to selectively operate the respective blower motors at one or more of the micro-climates. In some embodiments, real-time conditions reported by the wireless sensors in one or more Scheduling control may also be done proactively or predictively based on the current sensor data and/or system operation. For example, if pressure mode operation of the blower system at one or more of the micro-climates is activated in response to a current sensor event indicating temperatures exceeding a threshold at the corresponding micro-climate(s), the central control unit may (based on the current temperatures and/or other real-time sensor data at the corresponding micro-climate(s)) be configured to predict that respective temperatures at the micro-climate(s) will continue to drop at a respective rates, and may automatically schedule operation of the corresponding the air flow and/or hydronic mechanisms at a future time based on the predicted rate of change of the current soil profile temperature(s) in one or more of the zones. In some embodiments, the central control unit may be configured to alter operation of the air flow and/or hydronic mechanisms at one micro-climate based on real-time sensor data from another micro-climate. For example, based on observed changes in temperature and/or moisture levels at one of the micro-climates and its relative location to an adjacent micro-climate, the central control unit may be configured to predict that the temperature and/or moisture levels of the adjacent micro-climate will similarly change (e.g., based on relative locations of the corresponding green surfaces, stored historical data, and/or other known conditions such as the trajectory of the sun), and may transmit control signals to the corresponding local control unit to alter current and/or scheduled operation of the air flow and/or hydronic mechanisms coupled thereto based on the predicted changes. That is, embodiments described herein may thereby provide automatic adjustment or adaptation of scheduled turf management operations based on current operation and/or in response to receiving real-time sensor data from multiple different micro-climates.

Operation of respective turf management mechanisms at a plurality of micro-climates according to embodiments described herein can be fully automated and accessible through any internet connection or wireless device (e.g., the devices 500, 600) that is configured to be communicatively coupled to the central control unit. Computer readable program code implementing control operations and/or user interfaces as described herein may be stored in a memory including a non-transitory computer readable storage medium that is accessible to the processor or other controller of such devices, for example, via a wired or wireless network transceiver. That is, the user interfaces described herein may be provided via any display, including those of wired or wireless devices that are configured to be communicatively coupled to the central control unit via a wired and/or wireless communication interface.

Figure 7:
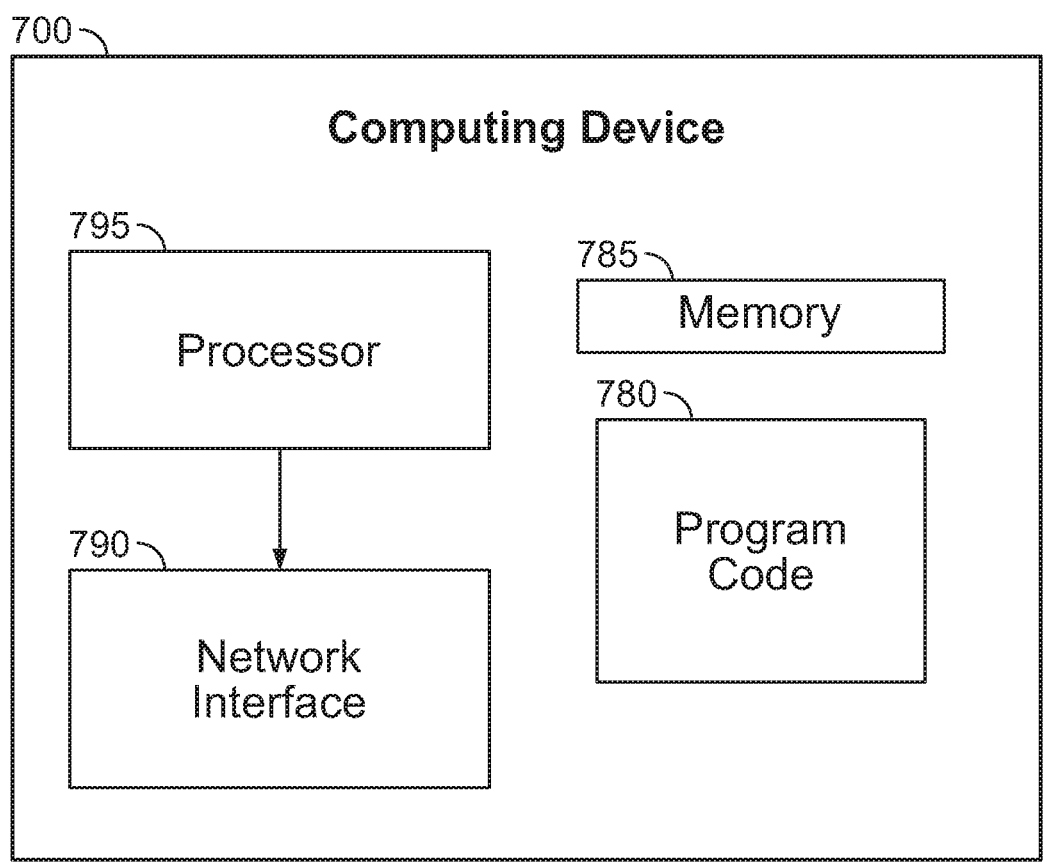
FIG. 7 is a block diagram of a computing device that may implement a central control circuit and/or a local control circuit in accordance with embodiments described herein.

FIG. 7 is a block diagram of an example computing device 700 that may be used to implement a central control unit (e.g., central control units 120, 220, 320, 520), local control unit (e.g., local control units 110, 210, 310, 410, 510, 810), user interface (e.g. user interfaces 140, 540, 640, 840, 940, 1040), and/or other computer hardware to perform the operations of one of more of the embodiments disclosed herein for one or more of those elements using hardware, software implemented with hardware, firmware, tangible computer-readable storage media having instructions stored thereon, or a combination thereof. The computing device can include one or more network interface circuits 790, one or more processor circuits 795 (referred to as "a processor" for brevity), and one or more memory circuits 785 (referred to as "a memory" for brevity) containing computer-readable program code 780. The computing device may further include input device(s), such as a keyboard or keypad, a display, and/or a speaker that communicate with the processor 795.

The processor 795 may include one or more data processing circuits, such as a general purpose and/or special purpose processor (e.g., a microprocessor, including, but not limited to, digital signal processor (DSP), field programmable gate array (FPGA), application specific integrated circuit (ASIC), and multi-core processors) or controller that may be collocated or distributed across one or more networks. The processor 795 communicates with the memory 785 via an address/data bus. The processor 795 is configured to execute program code 780 that is stored in the memory 785, described herein as a computer readable storage medium, to perform some or all of the operations for one or more of the embodiments disclosed herein.

The memory 785 may include removable and/or fixed non-volatile memory devices (such as but not limited to a hard disk drive, flash memory, and/or like devices that may store computer program instructions and data on computer-readable media), volatile memory devices (such as but not limited to random access memory), as well as virtual storage (such as but not limited to a RAM disk). The program code 780 may include an operating system that generally controls the operation of the computing device 700. In particular, the operating system may manage software and/or hardware resources and may coordinate execution of programs by the processor 795, for example, in providing the multi-climate turf management operations described herein.

In some embodiments, the network interface 790 provides communication capability with other computer systems on a same local network, on a different network connected via modems and the like to the present network, or to other computers across the Internet. In various embodiments of the present invention, the network interface can be implemented utilizing technologies including, but not limited to, Ethernet, Fast Ethernet, Gigabit Ethernet, wide-area network (WAN), etc. Additionally or alternatively, the network interface may include one or more radio transceivers configured to communicate with wireless devices using one or more radio access technologies. The radio access technologies may include, but are not limited to, Near Field Communication (NFC), Bluetooth, WLAN, 3GPP Long Term Evolution (LTE), etc.

The computing device 700 described herein may thus be provisioned with or may be otherwise configured to receive data from environmental sensors (e.g., the environmental sensors 125, 325, 525) that are local to respective micro-climates, provide the sensor data for display via a user interface, and/or independently control operation of respective turf management mechanisms (e.g., subsurface turf management mechanisms 115, 215, 315, 415, 515) at one or more of the micro-climates, as described herein.

Figure 8D:
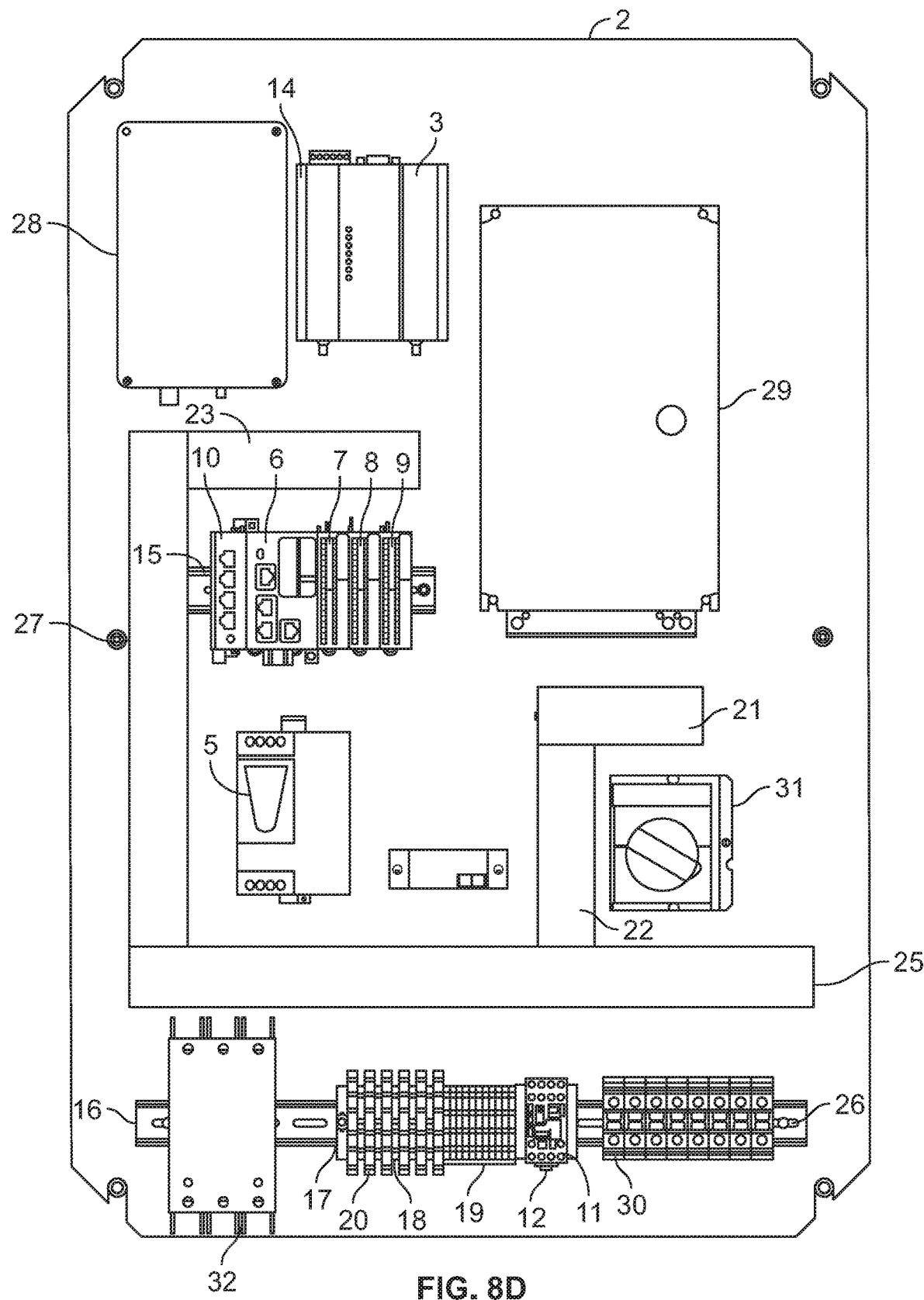
Figure 8E:
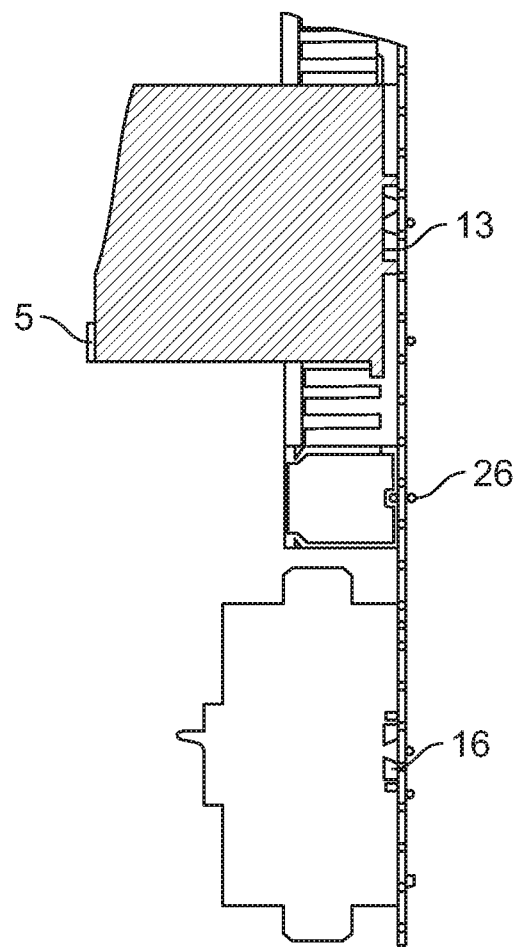
Figure 9A:
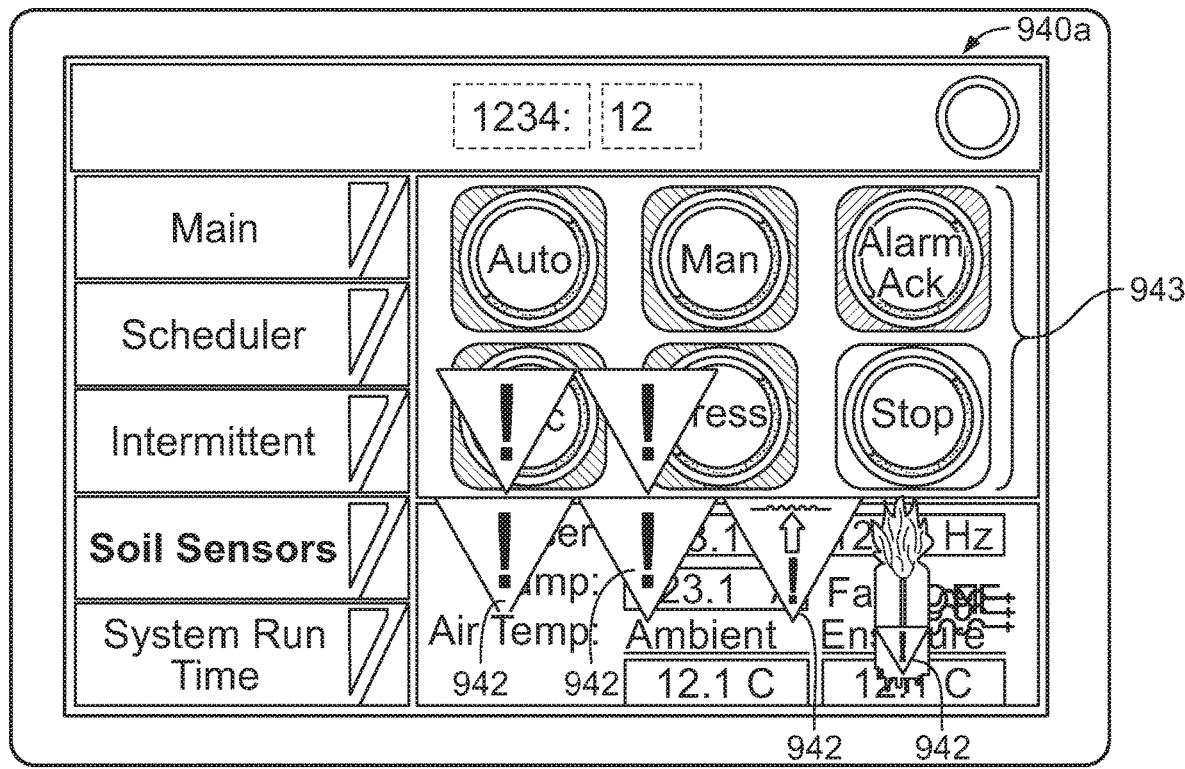
FIGS. 9A-9J illustrate example human machine interfaces displaying local condition data provided by environmental sensors and/or turf management mechanisms at a local control unit in accordance with embodiments described herein.
Figure 9B:
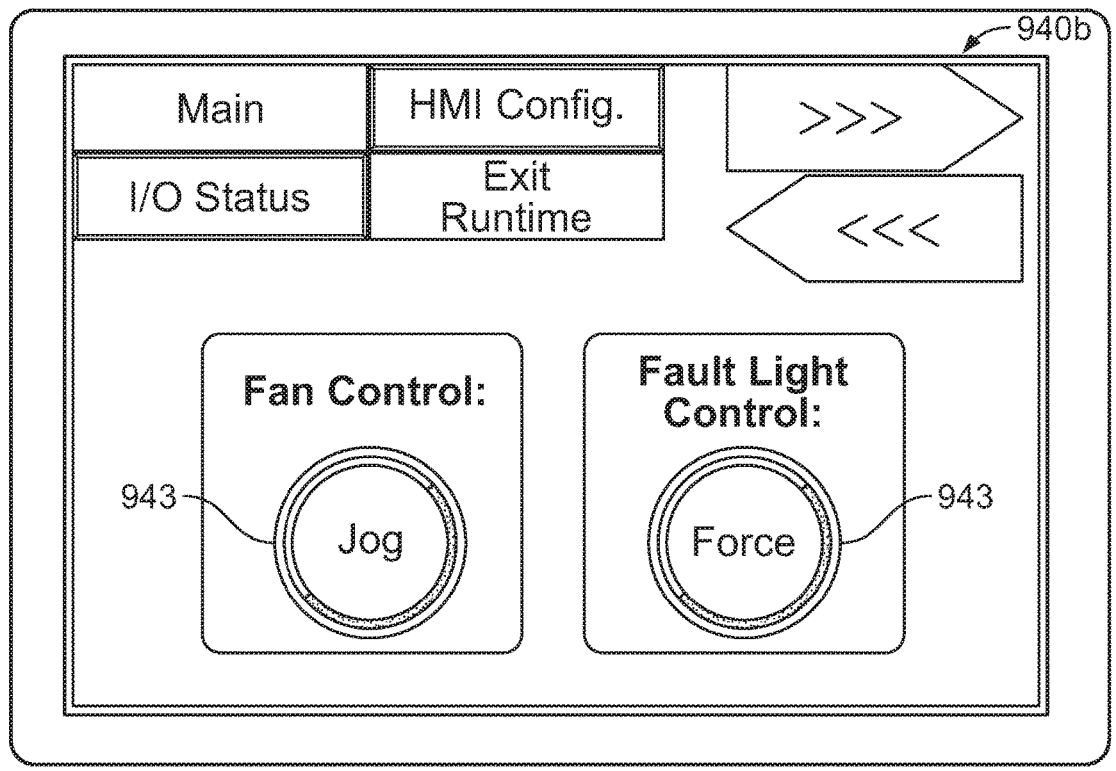
Figure 9C:
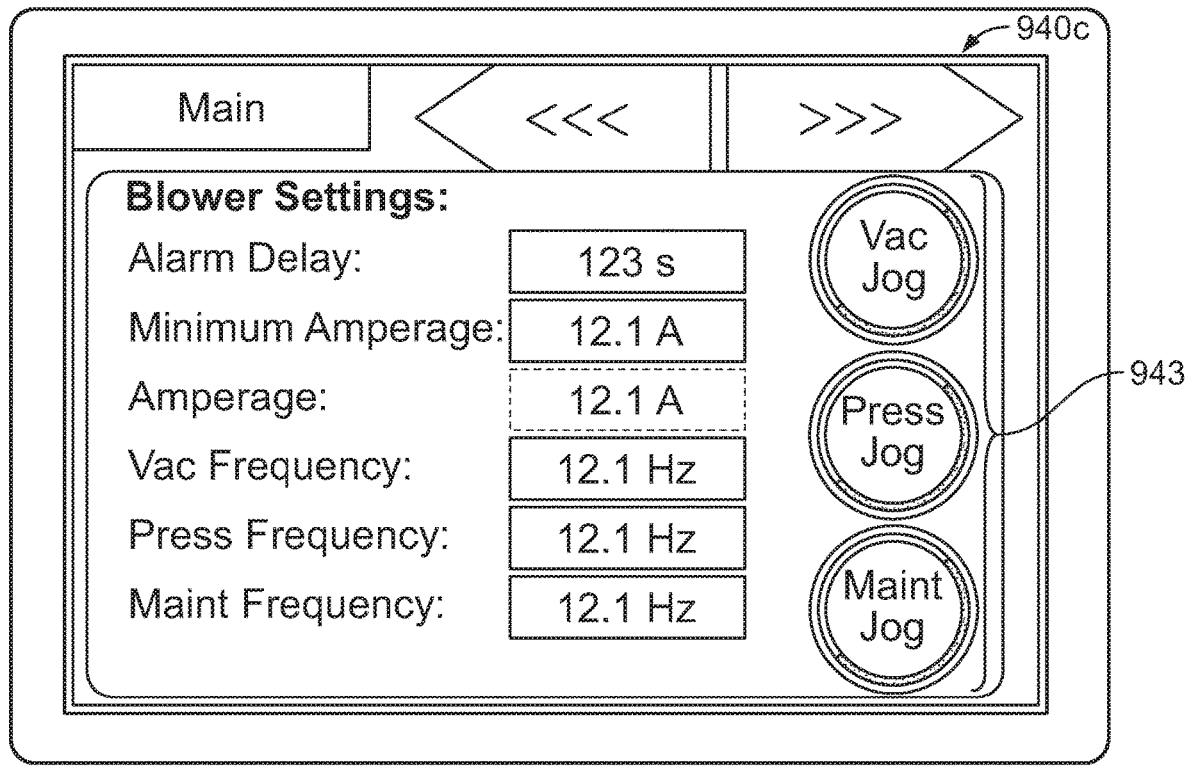
Figure 9D:
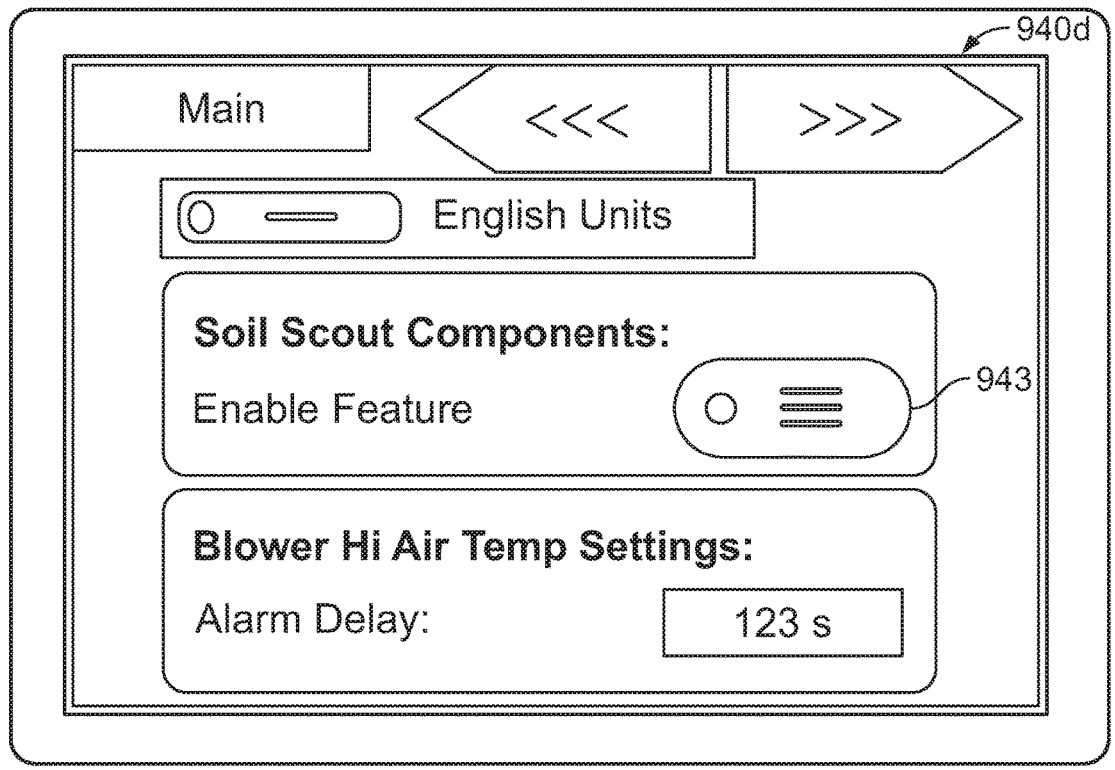
Figure 9E:
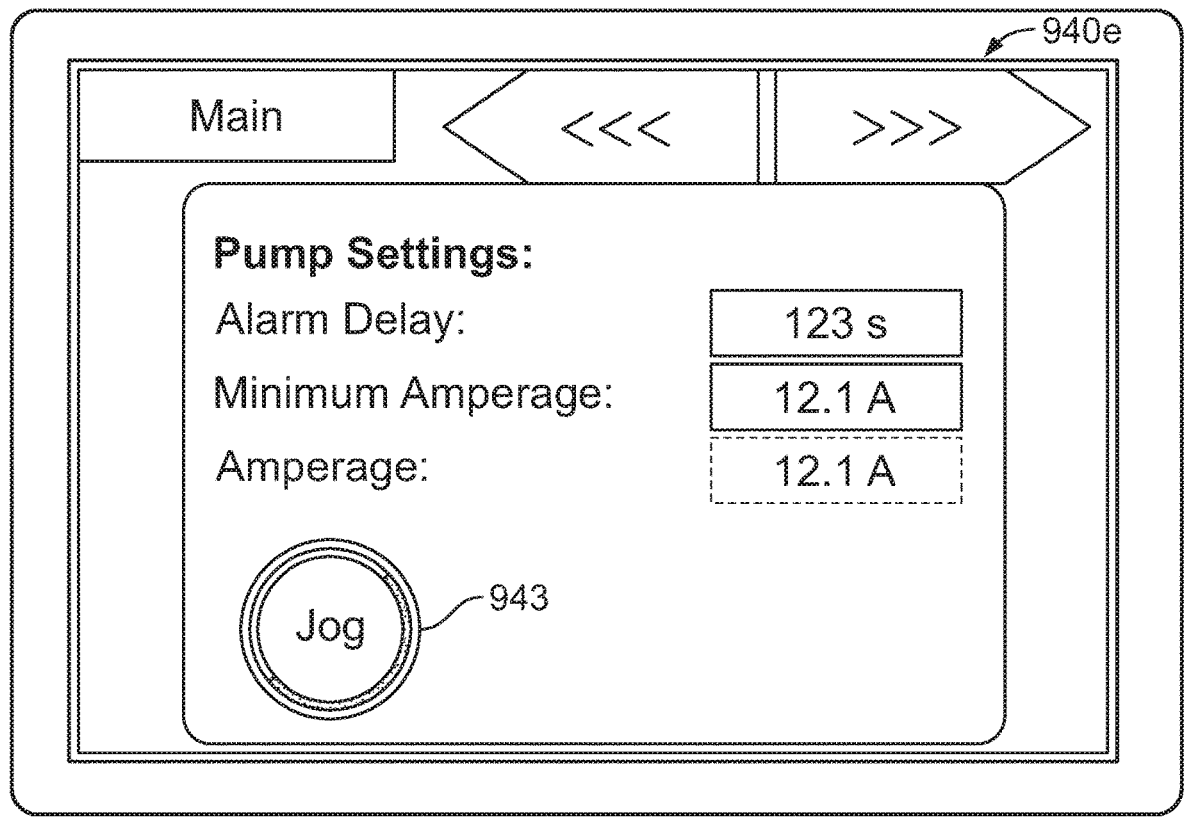
Figure 9F:
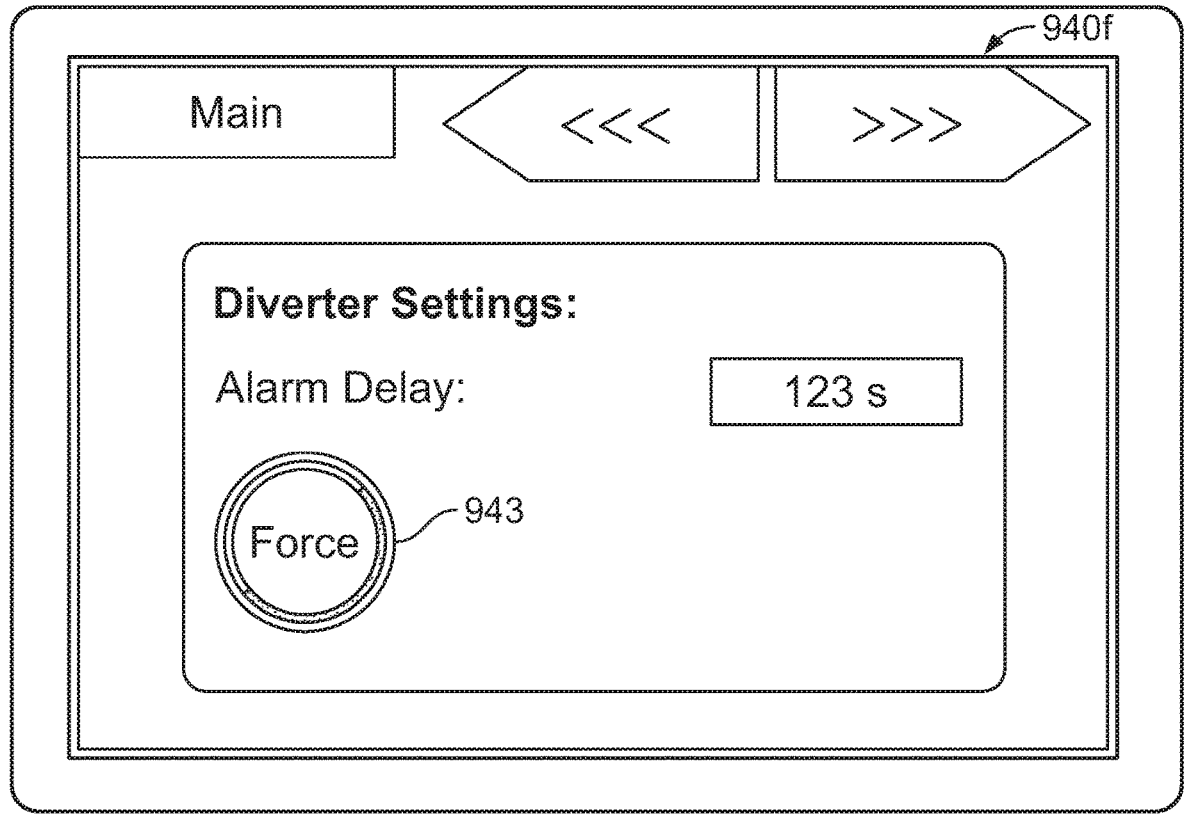
Figure 9G:
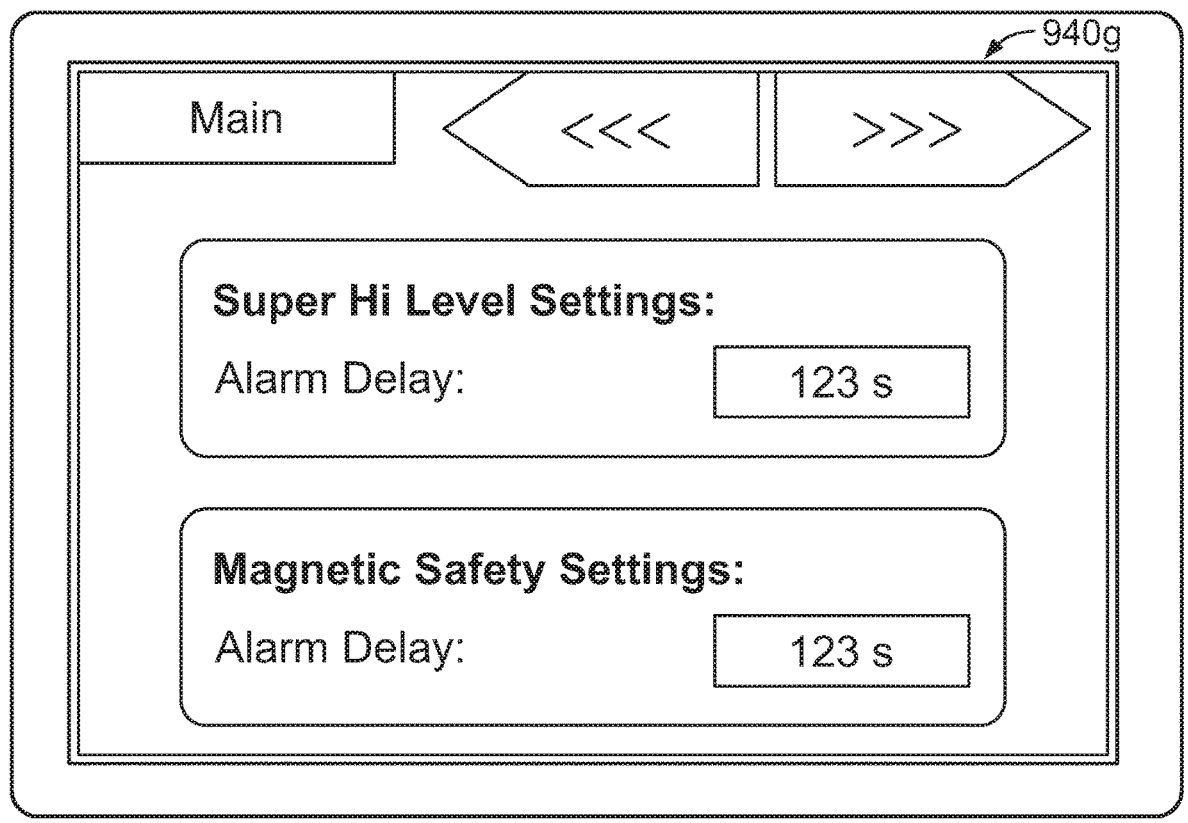
Figure 9H:
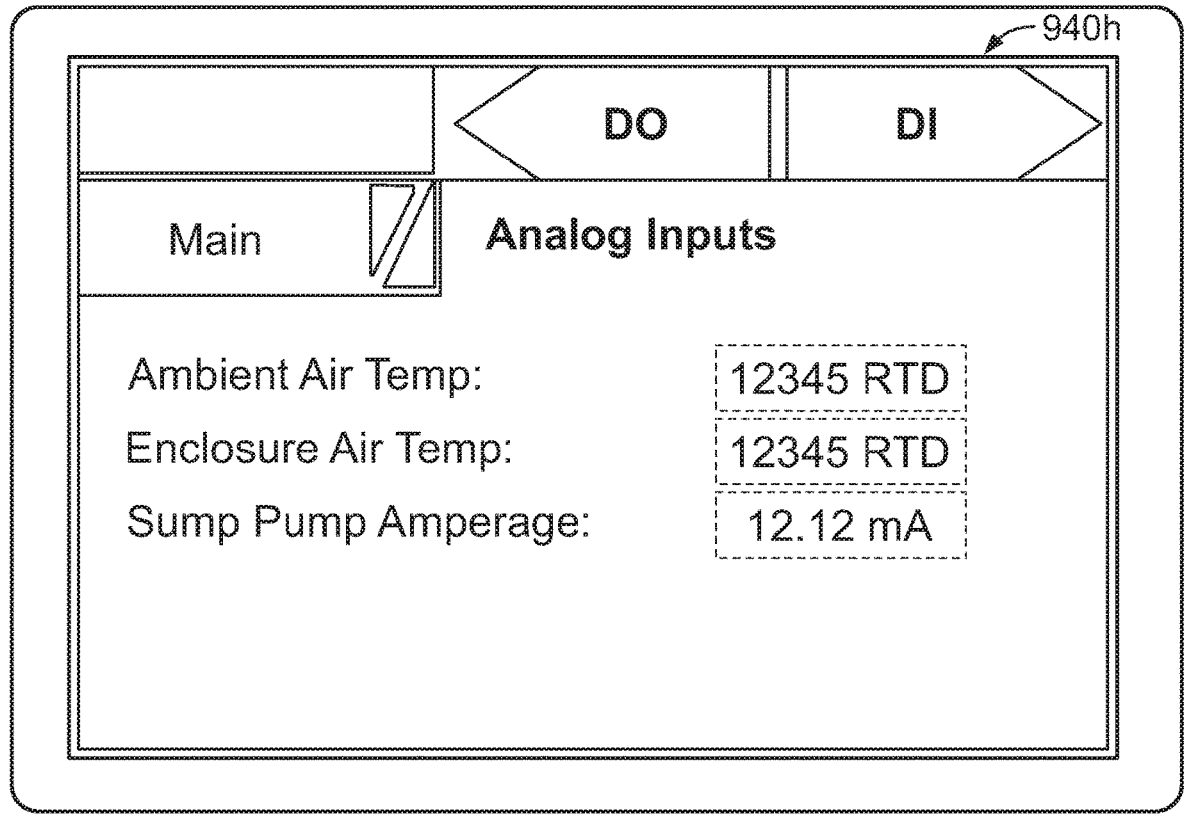
Figure 9I:
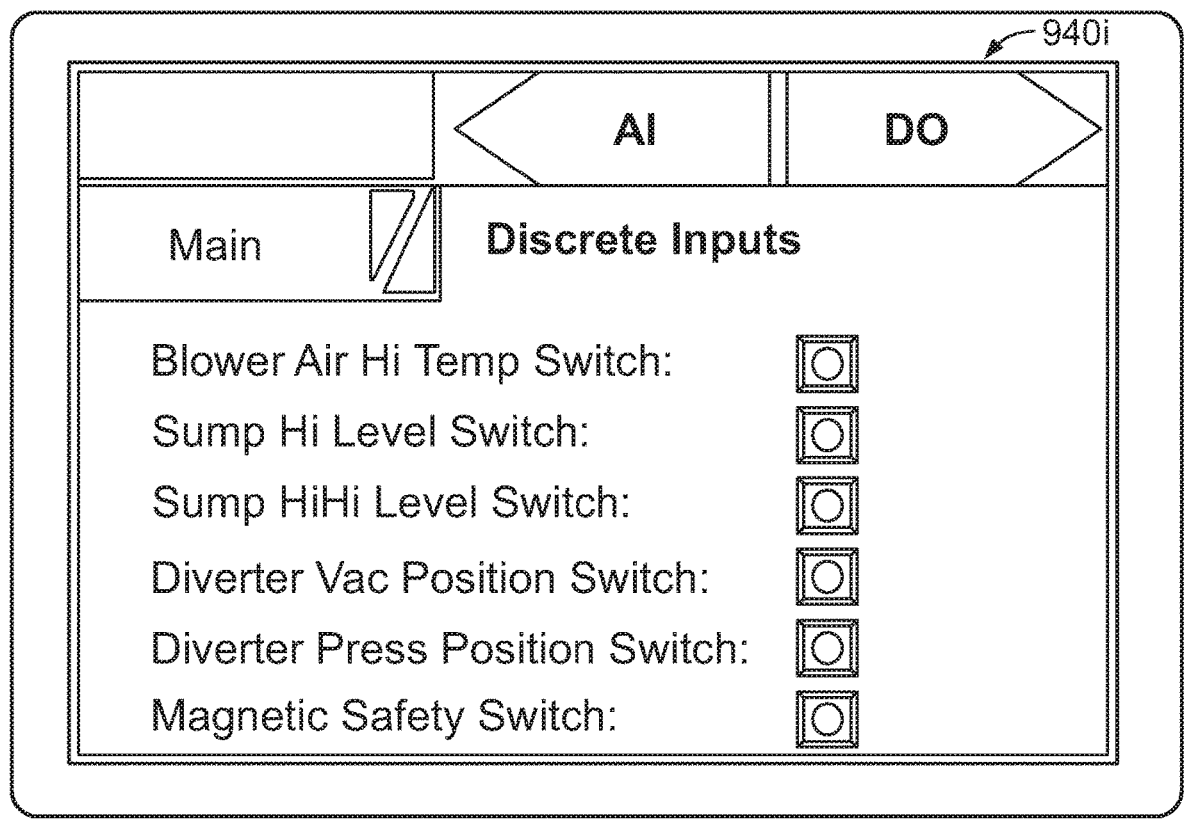
Figure 9J:
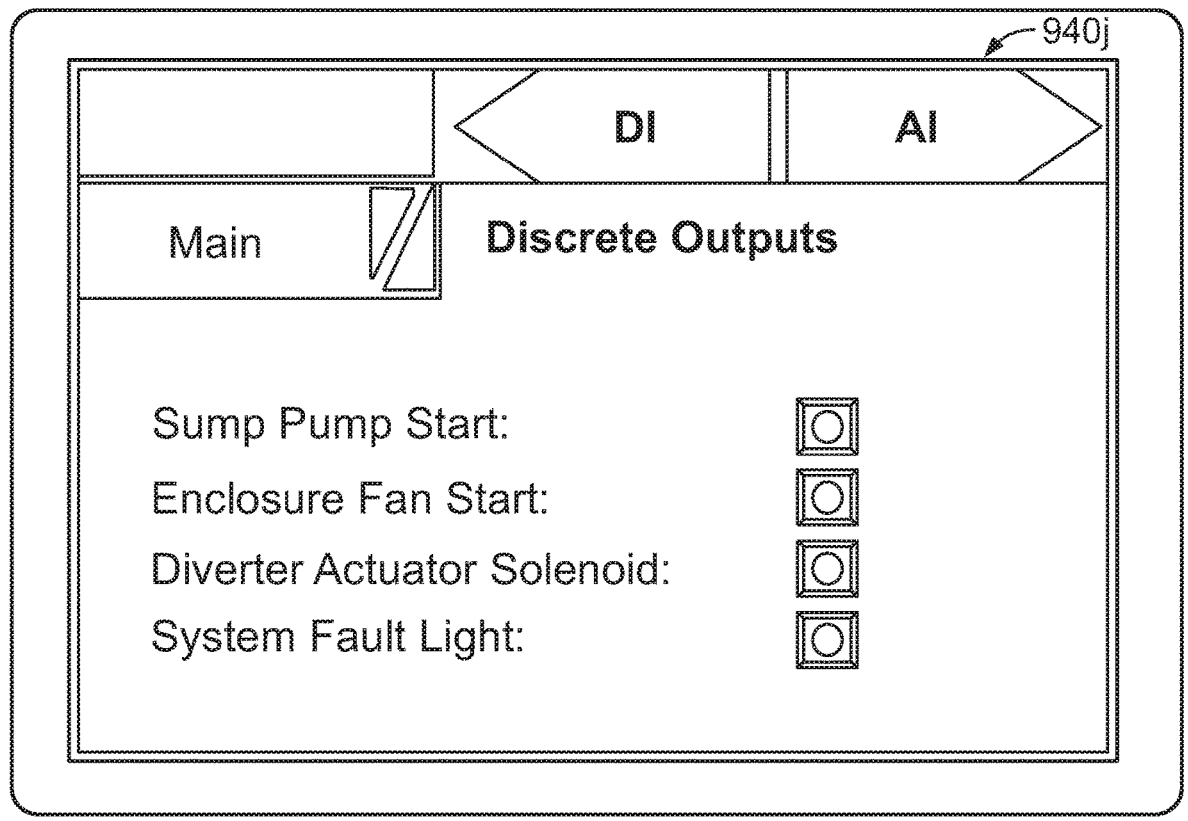
Figure 10A:
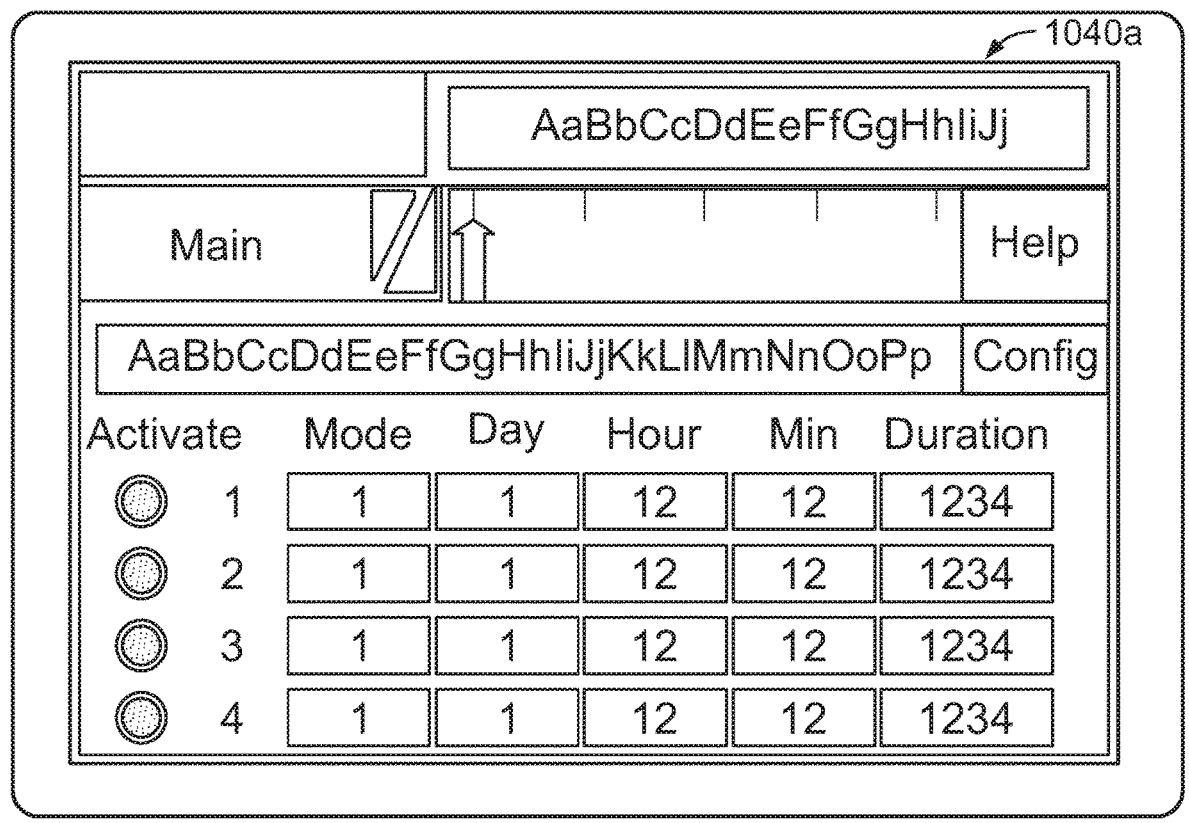
FIGS. 10A-10F illustrate example human machine interfaces displaying a scheduling application at a local control unit in accordance with embodiments described herein.
Figure 10B:
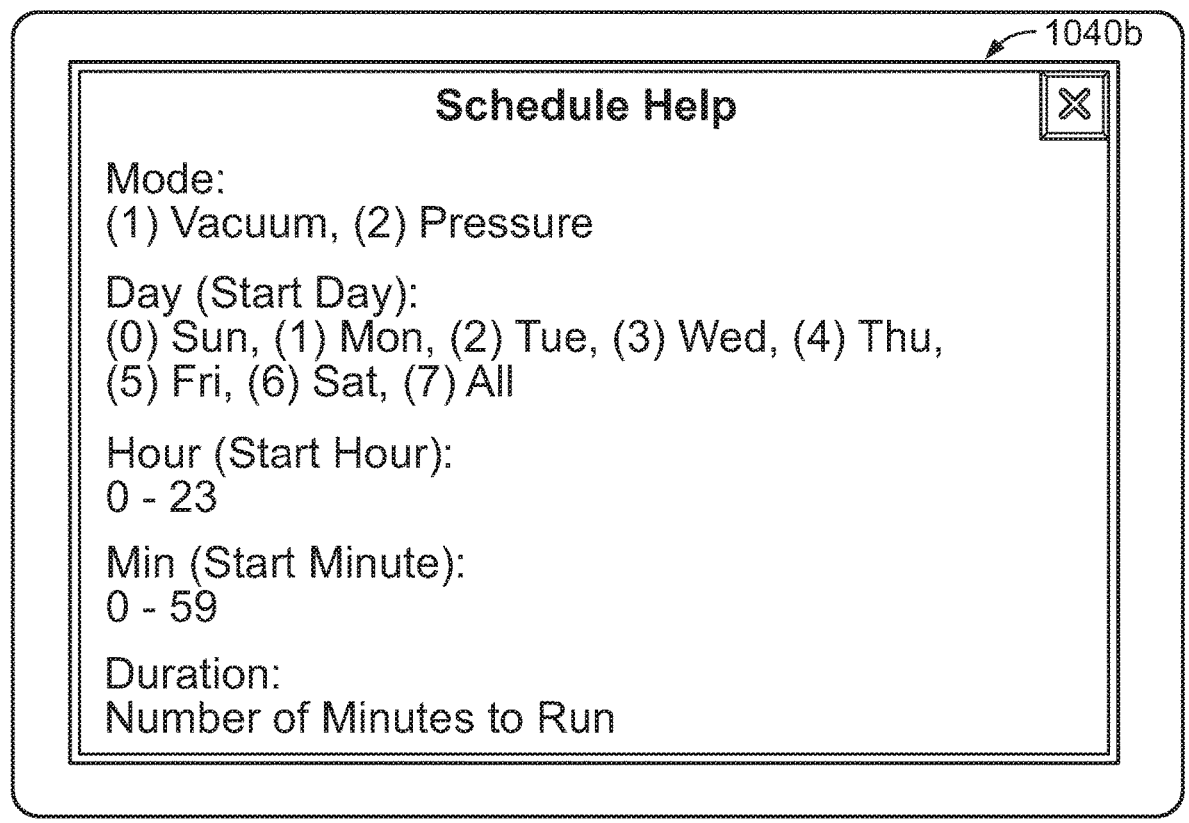
Figure 10C:
Figure 10D:
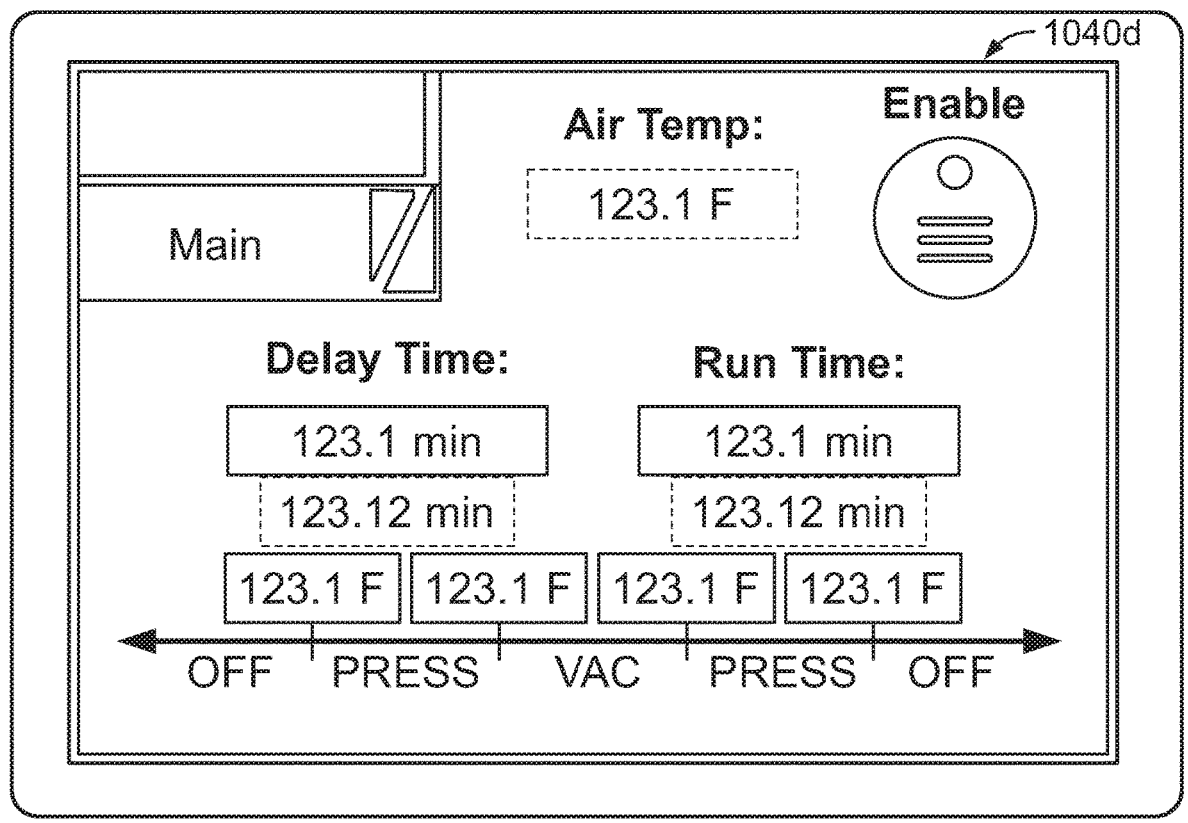
Figure 10E:
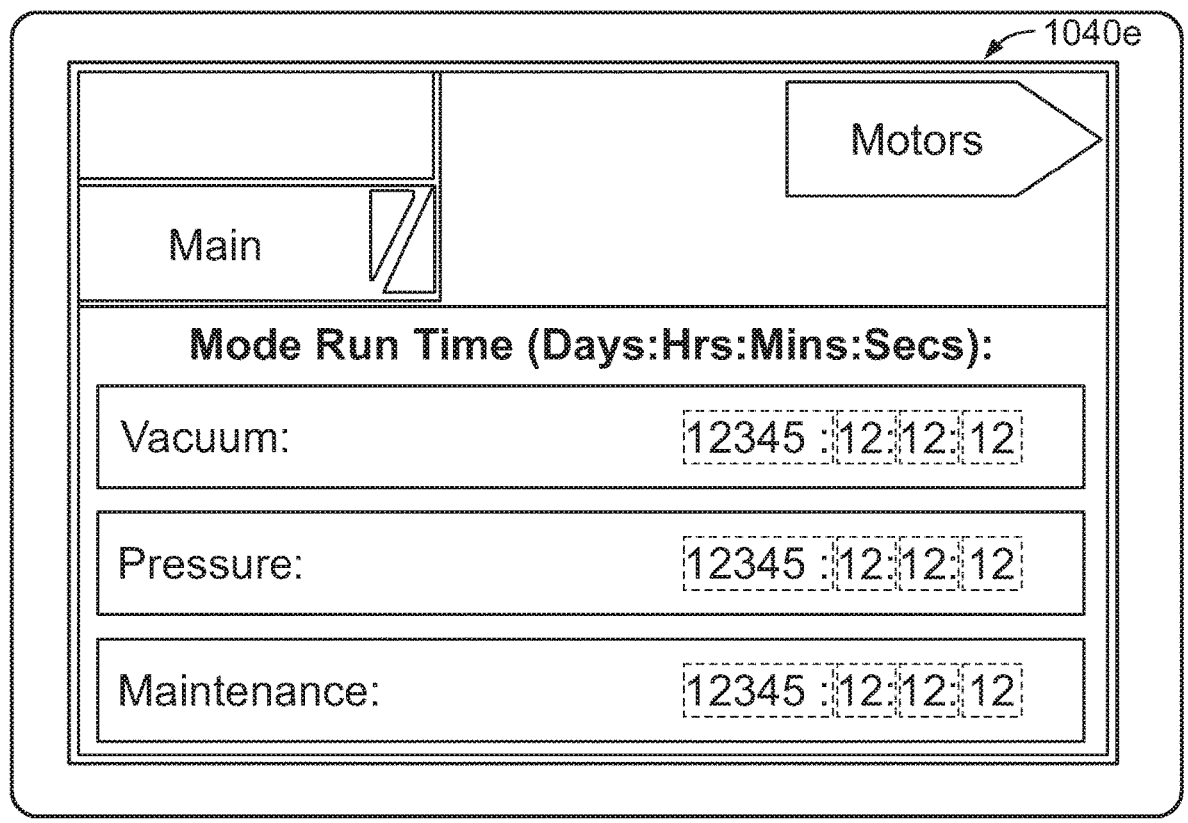
Figure 10F:
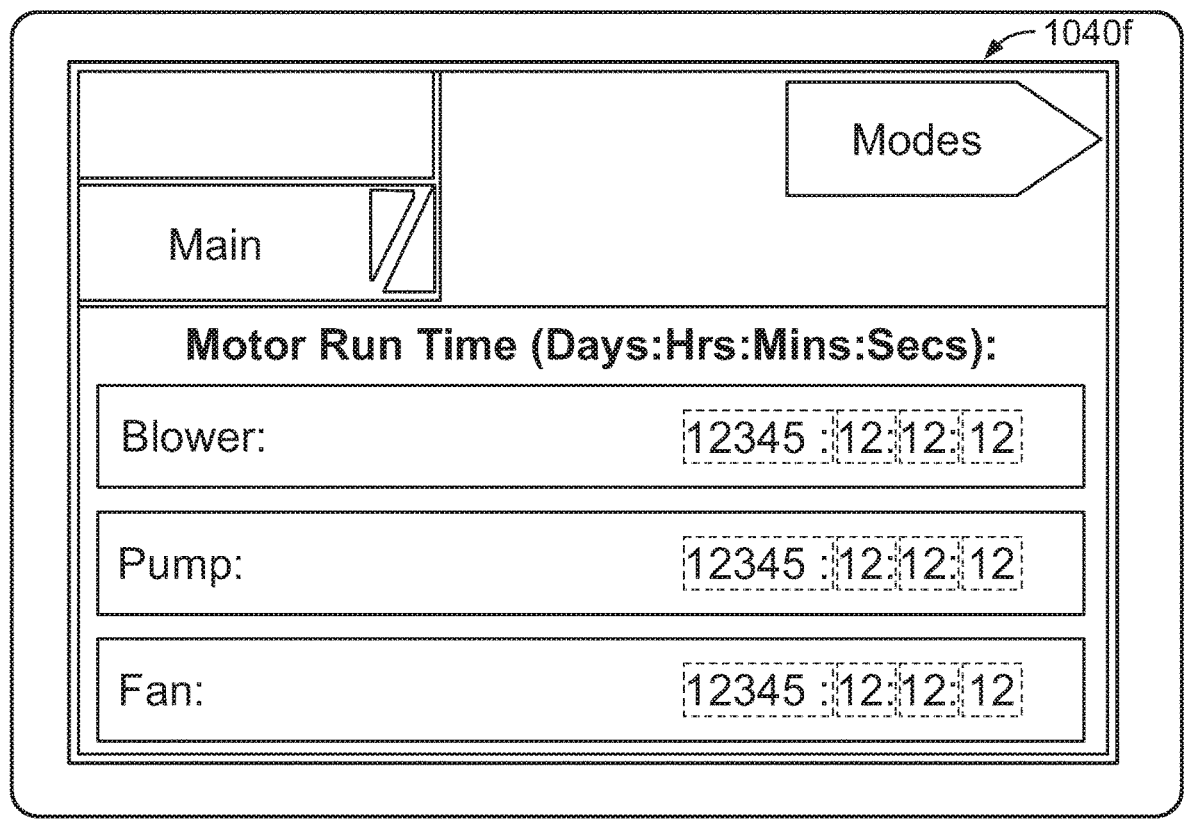

FIGS. 8A-8E are various views of a local control unit 810 in accordance with embodiments described herein (e.g., the local control units 110, 210, 310, 410, 510). In particular, FIGS. 8A-8E are views of a local control unit 810 in accordance with embodiments described herein as implemented as a freestanding desk console 1. FIGS. 8A and 8B are perspective views illustrating the freestanding desk console with the protective cover for an HMI 840 in open and closed positions, respectively. FIG. 8C is an enlarged side view illustrating articulation of the HMI 840 with the protective cover in the open position. FIG. 8D is an enlarged view illustrating a circuit board 2 that is installed in the local desk console 1. The circuit board 2 includes a programmable logic controller (PLC) 8 that is coupled to the HMI 840, as well as various inputs, ports, sockets, etc. by which the PLC 8 is communicatively coupled to the various elements of the local control unit 810. FIG. 8E is an enlarged cross-sectional view taken along line B-B of FIG. 8D, illustrating components of the DC current transducer 5 in greater detail.

More particularly, in the embodiments of FIGS. 8A-8E, the desk console 1 includes an electrical back mounting panel 2 including or providing connections for a wireless Ethernet modem 3, a dc current transducer 5, a power supply 6, a variable speed drive 7, a logic controller 8, analog inputs 9 (12 bits, tm3 module), digital inputs 10 (24 vdc, tm3 module), digital output relays 11 (tm3 module), a network module 12, a relay socket 13 (10a/300 v, 14 blade) a 3 pole circuit breaker 14 (35a, 480 vac), a relay (e-mech, 4 pdt, 24 vdc) 35 mm din rails 15-19, a w-series end bracket 20, a feed through terminal 21 (spring clamp connection), a test-disconnect terminal 22 (spring clamp connection), a z-series fuse terminal 23 (spring clamp connection), narrow slotted ducts 24-29 (with covers, panduit cat. no. c1.5lg6), a zinc plated, external hex head drilling screw 30 (#6, ⅜" long), a m6×1 serrated flange locknut 31, a top HMI panel plate 32, an air temperature sensor, a disconnect switch 34, an HMI interface 840, a universal panel 36, a panel mount indicator light 37 (water tight), stainless steel serrated flange locknuts (#10-32), stainless steel serrated-flange hex head screws (#10×½" long), a cooling fan 40 (115-230 vac), and an exhaust grille 39. This example implementation of the local control unit 810 as a freestanding desk console 1 is shown in detail in FIGS. 8A-8E for purposes of illustration rather than limitation, and it will be understood that variations in the implementation and/or components thereof may be included in embodiments described herein.

FIGS. 9A-9J illustrate example HMIs 940a-940j (generally referred to herein as "940") displaying local condition data provided by environmental sensors and/or turf management mechanisms at a local control unit in accordance with embodiments described herein (e.g., local control units 110, 210, 310, 410, 510, 810). In some embodiments, the HMI 940 of the local control unit may have more limited screen dimensions than the user interface at the central location (e.g. user interfaces 140, 540, 640), and thus, may display simplified representations of the local environmental conditions and/or operating parameters illustrated above in FIGS. 5C-5G. In particular, the HMIs 940a, 940b, 940c, 940d, 940e, 940f, 940g, 940h, 940i, and 940j of FIGS. 9A, 9B, 9C, 9D, 9E, 9F, 9G, 9H, 9I, and 9J display indications of faults or malfunctions 942 of one or more components, and virtual "buttons" 943 that can be used to control operation of the sub-soil air flow system coupled to the local control unit responsive to user inputs received via the HMIs, and provide confirmation of receipt and/or execution of the user inputs. Settings and operating parameters of components of the sub-soil air flow system, including the blower, pump, diverter, sump, fan, and/or other components, as well as inputs and/outputs thereof, can also be displayed via the HMI 940 of the corresponding local control unit.

FIGS. 10A-10F illustrate example HMIs 1040a-1040f (generally referred to herein as "1040") displaying a scheduling application at a local control unit in accordance with embodiments described herein (e.g., local control units 110, 210, 310, 410, 510, 810). As noted, in some embodiments the HMI of the local control unit may have more limited screen dimensions than the user interface at the central location (e.g. user interfaces 140, 540, 640), and thus, may display simplified representations of the scheduling application illustrated above in FIGS. 6A-6B. In particular, the HMIs 1040a, 1040b, 1040c, 1040d, 1040e, and 1040f are configured to receive user inputs specifying desired operating modes, including aeration/pressure (PRES) settings, moisture removal/vacuum (VAC) settings, temperature settings, and/or intermittent settings for multiple different micro-climates (shown as 4 green surfaces by way of example) as well as the desired start time, duration/run time, and day/date of operation for the respective operating modes of the sub-soil air flow system coupled to the local control unit, and are configured to provide confirmation of receipt and/or execution of the user inputs. Historical data showing run time for respective operating modes (e.g., vacuum, pressure, maintenance) and/or associated motors/mechanisms (e.g., blower, pump, enclosure fan) may also be displayed and monitored via the HMI 1040 of the corresponding local control unit.

Accordingly, embodiments described herein provide automatic monitoring and control of local conditions at a plurality of micro-climates, for example, in sporting event applications having multiple green surfaces that are exposed to different and/or varying environmental conditions, based on data received from wireless sensors in real time, even responsive to sudden changes in conditions. Also, although described herein primarily with reference to temperature regulation, some embodiments may be similarly operated to provide automatic moisture regulation based on the sensor data received from the in-ground wireless sensors. For example, responsive detecting moisture levels indicative of a sudden downpour, the air flow mechanism at one or more micro-climates may be automatically operated in vacuum mode and/or the hydronic mechanism may be automatically operated to increase or decrease the temperature of fluid circulating in the hydronic tubing to reduce excess moisture in the soil profile, in accordance with known static conditions (e.g., the respective topographies and/or drainage conditions) of each micro-climate. Some embodiments described herein may also maintain historical data to provide information of the impact of agronomic practices, natural phenomena and weather events on turf conditions. As such, embodiments described herein may more evenly distribute temperature and/or moisture and thus reduce variation of conditions in multiple green surfaces of an operating environment, which may be of particular benefit in golf applications.

The present invention has been described above with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout.

It will be understood that when an element is referred to as being "on," "connected," or "coupled" to another element, it can be directly on, connected, or coupled to the other element, or intervening elements may be present. In contrast, when an element is referred to as being "directly on," "directly connected," or "directly coupled" to another element, there are no intervening elements present.

It will also be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The Figures illustrate the architecture, functionality, and operations of embodiments of hardware and/or software according to various embodiments of the present invention. It will be understood that each block of a flowchart and/or block diagram illustrations, and combinations of blocks in the flowchart and/or block diagram illustrations, may be implemented by computer program instructions and/or hardware operations. In this regard, each block represents a module, segment, or portion of code, which comprises one or more executable instructions for implementing the specified logical function(s). It should be noted that, in other implementations, the function(s) noted in the blocks may occur out of the order noted in the Figures. For example, two blocks shown in succession may, in fact, be executed substantially concurrently, or the blocks may sometimes be executed in the reverse order, depending on the functionality involved.

The computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks. The computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

Unless otherwise defined, all terms used in disclosing embodiments of the invention, including technical and scientific terms, have the same meaning as commonly understood by one of ordinary skill in the art to which this invention belongs, and are not necessarily limited to the specific definitions known at the time of the present invention being described. Accordingly, these terms can include equivalent terms that are created after such time. It will be further understood that terms, such as those defined in commonly used dictionaries, should be interpreted as having a meaning that is consistent with their meaning in the present specification and in the context of the relevant art and will not be interpreted in an idealized or overly formal sense unless expressly so defined herein. All publications, patent applications, patents, and other references mentioned herein are incorporated by reference in their entireties.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments of the present invention described herein, and of the manner and process of making and using them, and shall support claims to any such combination or subcombination.

Although the invention has been described herein with reference to various embodiments, it will be appreciated that further variations and modifications may be made within the scope and spirit of the principles of the invention. Although specific terms are employed, they are used in a generic and descriptive sense only and not for purposes of limitation. The following claim is provided to ensure that the present application meets all statutory requirements as a priority application in all jurisdictions and shall not be construed as setting forth the scope of the present invention.

The invention claimed is:

1. A turf management system for a multi-climate environment, the system comprising:
a plurality of local control circuits comprising respective communication interfaces that are configured to receive sensor data in a first format from environmental sensors that are locally positioned in-ground at different green surfaces of a sporting event, wherein the different green surfaces are remote from one another and include respective micro-climates of the multi-climate environment; and
a central control circuit comprising a network interface that is configured to receive data indicating changing local conditions at the respective micro-climates in a second format from the local control circuits, and a processor that is configured to aggregate the data indicating the changing local conditions at the respective micro-climates into a global overview of the changing local conditions at the respective micro-climates for output to a user interface, wherein the user interface is configured to simultaneously display the changing local conditions at multiple of the respective micro-climates in real-time to indicate inconsistencies at the different green surfaces of the sporting event,
wherein the local control circuits comprise respective processors that are coupled to the respective communication interfaces, wherein the respective processors are configured to locally convert the sensor data in the first format into the data indicating the changing local conditions at the respective micro-climates in the second format, and transmit the data indicating the changing local conditions at the respective micro-climates to the central control circuit.

2. The system of claim 1, wherein the local control circuits are configured to be coupled to and to control operation of respective subsurface turf management mechanisms comprising sub-soil air flow mechanisms and/or in-ground hydronic mechanisms that are locally positioned at the different green surfaces such that variation in the changing local conditions is reduced responsive to respective user inputs received via respective local user interfaces thereof, and/or responsive to respective control signals received from the central control circuit.

3. The system of claim 1, wherein the respective communication interfaces of the local control circuits are configured to receive the sensor data from the environmental sensors via a first communication network, and wherein the network interface of the central control circuit is configured to receive the data indicating the changing local conditions at the respective micro-climates via a second communication network that is different from the first communication network.

4. The system of claim 3, wherein the local control circuits comprise respective network interfaces that are configured to receive the data indicating the changing local conditions at one of the respective micro-climates from another of the local control circuits via the second communication network, and relay the data indicating the changing local conditions at the one of the respective micro-climates to the central control circuit via the second communication network.

5. A central control circuit for turf management of a multi-climate environment, the central control circuit comprising:
   a network interface that is configured to receive data indicating changing local conditions at respective micro-climates of the multi-climate environment in a first format from local control circuits that are positioned at or near different green surfaces of a sporting event that are remote from one another, wherein the data indicating the changing local conditions at the respective micro-climates is locally converted into the first format at the local control circuits based on sensor data in a second format received from environmental sensors that are locally positioned in-ground at the different green surfaces; and
   a processor coupled to the network interface and configured to aggregate the data indicating the changing local conditions at the respective micro-climates into a global overview of the changing local conditions at the respective micro-climates for output to a user interface, wherein the user interface is configured to simultaneously display the changing local conditions at multiple of the respective micro-climates in real-time to indicate inconsistencies at the different green surfaces of the sporting event,
   wherein the processor is further configured to generate respective control signals and transmit the respective control signals to one or more of the local control circuits via the network interface responsive to receiving the data indicating the changing local conditions at the respective micro-climates.

6. The central control circuit of claim 5, wherein the processor is configured to transmit the respective control signals based on differences in reception of the data from the local control circuits, wherein the respective control signals are configured to control the one or more of the local control circuits to relay the data indicating the changing local conditions at one of the respective micro-climates from another of the local control circuits.

7. The central control circuit of claim 5, wherein the respective control signals are configured to control the one or more of the local control circuits to alter operation of respective subsurface turf management mechanisms that are coupled thereto based on the data indicating the changing local conditions at the respective micro-climates.

8. The central control circuit of claim 7, wherein the processor is configured to receive respective user-defined thresholds for soil temperature and/or moisture level of one or more of the respective micro-climates via the user interface, and transmit the respective control signals to the one or more of the local control circuits in real-time via the network interface when the changing local conditions at the one or more of the respective micro-climates falls outside the respective user-defined thresholds.

9. The central control circuit of claim 7, wherein the respective control signals are configured to control the one or more of the local control circuits to alter the operation of the respective subsurface turf management mechanisms coupled thereto to increase consistency of soil temperature and/or moisture level among the respective micro-climates.

10. The central control circuit of claim 7, wherein the processor is configured to transmit the respective control signals to the one or more of the local control circuits via the network interface based on a schedule of operation specifying times and/or order of operation of the respective subsurface turf management mechanisms coupled thereto.

11. The central control circuit of claim 7, wherein the processor is configured to transmit the respective control signals via the network interface to the one or more of the local control circuits to alter future scheduled operation of the respective subsurface turf management mechanisms coupled thereto based on the data indicating the changing local conditions from at least one other of the local control circuits and a predicted rate of change based thereon.

12. The central control circuit of claim 5, wherein the local conditions comprise local environmental conditions at the respective micro-climates, and/or local operating conditions of respective subsurface turf management systems that are locally positioned at the different green surfaces.

13. The central control circuit of claim 5, wherein the local control circuits are configured to receive the sensor data from the environmental sensors via a first communication network, and wherein the network interface of the central control circuit is configured to receive the data indicating the changing local conditions at the respective micro-climates via a second communication network that is different from the first communication network.

14. A computer program product for turf management of a multi-climate environment, the computer program product comprising:
   a non-transitory computer readable storage medium comprising computer readable program code that, when executed by a processor, causes the processor to perform operations comprising:
   receiving, via a network interface, aggregated data in a first format indicating changing local conditions at respective micro-climates of the multi-climate environment at different green surfaces of a sporting event that are remote from one another, wherein the data is based on sensor data in a second format from environmental sensors that are locally positioned in-ground at the different green surfaces, and wherein the aggregated data comprises a global overview of the changing local conditions at the respective micro-climates;
   simultaneously displaying, via a user interface, the changing local conditions at multiple of the respective micro-climates in real-time to indicate inconsistencies at the different green surfaces of the sporting event;

receiving, via the user interface, user input corresponding to one or more of the respective micro-climates responsive to the displaying; and transmitting, via the network interface, signals indicative of the user input to a central control circuit, wherein the aggregated data in the first format is received from the central control circuit, wherein the central control circuit is communicatively coupled to local control circuits that are positioned at or near the different green surfaces and are communicatively coupled to the environmental sensors, and wherein the sensor data in the second format is locally converted into the first format at the local control circuits.

15. The computer program product of claim 14, wherein the central control circuit is communicatively coupled to the local control circuits via a first communication network, and wherein the local control circuits are communicatively coupled to the environmental sensors via a second communication network that is different from the first communication network.

16. The computer program product of claim 14, wherein the user input comprises respective user-defined thresholds for soil temperature and/or moisture levels of the one or more of the respective micro-climates, and wherein the operations further comprise:

providing, via the user interface, one or more indicators for the one or more of the respective micro-climates having soil temperature and/or moisture levels that fall outside the respective user-defined thresholds.

17. The computer program product of claim 6, wherein the operations further comprise:

displaying, via the user interface, a schedule of operation for respective subsurface turf management mechanisms, wherein the respective subsurface turf management mechanisms are locally positioned at corresponding ones of the different green surfaces and are coupled to corresponding ones of the local control circuits at or near the different green surfaces, wherein the user input specifies times and/or order of operation of one or more of the respective subsurface turf management mechanisms corresponding to the one or more of the respective micro-climates.

18. A turf management system for a multi-climate environment, the system comprising:

a plurality of local control circuits comprising respective communication interfaces that are configured to receive sensor data in a first format from environmental sensors that are locally positioned at different green surfaces, wherein the different green surfaces are remote from one another and include respective micro-climates of the multi-climate environment; and a central control circuit comprising a network interface that is configured to receive data indicating differing local conditions at the respective micro-climates in a second format from the local control circuits, and a processor that is configured to aggregate the data indicating the differing local conditions at the respective micro-climates into a global overview that indicates the differing local conditions at the respective micro-climates in real-time for output to a user interface, wherein the local control circuits comprise respective processors that are coupled to the respective communication interfaces, wherein the respective processors are configured to locally convert the sensor data in the first format into the data indicating differing local conditions at the respective micro-climates in the second format, and transmit the data indicating differing local conditions at the respective micro-climates to the central control circuit, wherein the local control circuits are configured to be coupled to and to control operation of respective sub-surface turf management mechanisms comprising sub-soil air flow mechanisms and/or in-ground hydronic mechanisms that are locally positioned at the different green surfaces, wherein the sensor data is received from the environmental sensors that are locally positioned at respective depths below the different green surfaces, wherein two or more of the respective depths are different, and wherein the local control circuits are configured to control operation of the respective subsurface turf management mechanisms to heat or cool soil profiles overlying the sub-soil air flow mechanisms and/or the in-ground hydronic mechanisms based on the sensor data.

19. The system of claim 18, wherein the local control circuits are configured to determine soil profile temperatures at the respective depths responsive to the sensor data, and automatically control circulation and temperature of fluid in hydronic tubing of the in-ground hydronic mechanisms based on the soil profile temperatures at the respective depths.

20. The system of claim 19, wherein the local control circuits are configured to automatically control blower units of the sub-soil air flow mechanisms to provide heated or cooled air to the soil profiles based on the soil profile temperatures at the respective depths.

21. The computer program product of claim 14, wherein the local control circuits are configured to be coupled to and to control operation of respective subsurface turf management mechanisms comprising sub-soil air flow mechanisms and/or in-ground hydronic mechanisms that are locally positioned at the different green surfaces, wherein the sensor data is received from the environmental sensors that are locally positioned at respective depths below the different green surfaces, wherein two or more of the respective depths are different, and wherein the local control circuits are configured to control operation of the respective subsurface turf management mechanisms to heat or cool soil profiles overlying the sub-soil air flow mechanisms and/or the in-ground hydronic mechanisms based on the sensor data.

22. The central control circuit of claim 7, wherein the respective subsurface turf management mechanisms comprise sub-soil air flow mechanisms and/or in-ground hydronic mechanisms that are locally positioned at the different green surfaces, wherein the sensor data is received from the environmental sensors that are locally positioned at respective depths below the different green surfaces, wherein two or more of the respective depths are different, and wherein the one or more of the local control circuits are configured to control operation of the respective subsurface turf management mechanisms to heat or cool soil profiles overlying the sub-soil air flow mechanisms and/or the in-ground hydronic mechanisms based on the sensor data.

* * * * *

UNITED STATES PATENT AND TRADEMARK OFFICE
CERTIFICATE OF CORRECTION

| | |
|---|---|
| PATENT NO. | : 11,234,381 B1 |
| APPLICATION NO. | : 16/267656 |
| DATED | : February 1, 2022 |
| INVENTOR(S) | : Bruce E. Mikkelson |

It is certified that error appears in the above-identified patent and that said Letters Patent is hereby corrected as shown below:

In the Claims

Column 23, Line 30, Claim 17: Please correct "claim 6" to read -- claim 14 --

Signed and Sealed this
Seventeenth Day of May, 2022

Katherine Kelly Vidal
*Director of the United States Patent and Trademark Office*